United States Patent
Imahashi et al.

(10) Patent No.: US 6,594,439 B2
(45) Date of Patent: Jul. 15, 2003

(54) ENCODED STREAM GENERATING APPARATUS AND METHOD, DATA TRANSMISSION SYSTEM AND METHOD, AND EDITING SYSTEM AND METHOD

(75) Inventors: Kazuyasu Imahashi, Kanagawa (JP); Toshihiko Kitazawa, Kanagawa (JP)

(73) Assignee: Sony Corporation, Tokyo (JP)

(*) Notice: Subject to any disclaimer, the term of this patent is extended or adjusted under 35 U.S.C. 154(b) by 62 days.

(21) Appl. No.: 09/924,915

(22) Filed: Aug. 8, 2001

(65) Prior Publication Data

US 2001/0048803 A1 Dec. 6, 2001

Related U.S. Application Data

(62) Division of application No. 09/317,329, filed on May 24, 1999, now Pat. No. 6,438,371, which is a continuation of application No. PCT/JP98/04292, filed on Sep. 25, 1998.

(30) Foreign Application Priority Data

Sep. 25, 1997 (JP) .............................................. 9-260033

(51) Int. Cl.[7] ................................................ H04N 5/93
(52) U.S. Cl. ............................ 386/52; 386/55; 386/98; 725/148
(58) Field of Search ...................... 386/52, 55, 46, 386/95, 83, 99, 102, 109; 725/131, 133, 148; H04N 5/93

(56) References Cited

U.S. PATENT DOCUMENTS

| 5,598,415 | A | | 1/1997 | Nuber et al. |
|---|---|---|---|---|
| 5,699,124 | A | | 12/1997 | Nuber et al. |
| 5,701,153 | A | | 12/1997 | Reichek et al. |
| 5,703,859 | A | | 12/1997 | Tahara et al. |
| 5,844,594 | A | * | 12/1998 | Ferguson .................... 725/131 |
| 5,844,615 | A | | 12/1998 | Nuber et al. |
| 6,438,317 | B1 | * | 8/2002 | Imahashi et al. ........... 386/109 |
| 6,453,112 | B2 | * | 9/2002 | Imahashi et al. ............. 386/46 |

FOREIGN PATENT DOCUMENTS

| JP | 4-107084 | 4/1992 |
|---|---|---|
| JP | 4-332991 | 11/1992 |
| JP | 8-168042 | 6/1996 |
| JP | 8-205170 | 8/1996 |
| JP | 9-8763 | 1/1997 |
| JP | 9-161456 | 6/1997 |
| JP | 9-163304 | 6/1997 |
| JP | 10-98677 | 4/1998 |

OTHER PUBLICATIONS

Coding of Moving Pictures and Associated Audio, May 10, 1994, 2 pages.

* cited by examiner

Primary Examiner—Vincent Boccio
(74) Attorney, Agent, or Firm—Frommer Lawrence & Haug LLP; William S. Frommer; Dennis M. Smid

(57) ABSTRACT

A method and apparatus for generating an encoded data stream representing a number of pictures or frames and having a number of layers including a picture layer in which time code information attached to the original data is described or inserted therein for each picture. Such time code information may be inserted into a user data area of the picture layer of the encoded data stream.

42 Claims, 15 Drawing Sheets

| video_sequence(){ | No. of bits | Mnemonic |
|---|---|---|
| next_start_code() | | |
| sequence_header() | | |
| sequence_extension() | | |
| do{ | | |
| extension_and_user_data(0) | | |
| do{ | | |
| if(nextbits()==group_start_code){ | | |
| group_of_pictures_header() | | |
| extension_and_user_data(1) | | |
| } | | |
| picture_header() | | |
| picture_coding_extension() | | |
| extensions_and_user_data(2) | | |
| picture_data() | | |
| }while((nextbits()==picture_start_code) \|\| | | |
| (nextbits()==group_start_code)) | | |
| if(nextbits()!=sequence_end_code){ | | |
| sequence_header() | | |
| sequence_extension() | | |
| } | | |
| }while(nextbits()!=sequence_end_code) | | |
| sequence_end_code | 32 | bslbf |
| } | | |

FIG.6

| extension_and_user_data(i){ | No. of bits | Mnemonic |
|---|---|---|
| while((nextbits()==extension_start_code) \|\| | | |
| (nextbits()==user_data_start_code)){ | | |
| if((i==2)&&(nextbits()==extension_start_code)) | | |
| extension_data() | | |
| if(nextbits()==user_data_start_code) | | |
| user_data() | | |
| } | | |
| } | | |

FIG.7

| user_data(){ | No. of bits | Mnemonic |
|---|---|---|
| user_data_start_code | 32 | bslbf |
| while(nextbits!()='0000 0000 0000 0000 0000 0001'{ | | |
| if(nextbits()==time_code_start_code){ | | |
| time_code() | | |
| } | | |
| else{ | | |
| user_data | | |
| } | | |
| } | | |
| next_start_code() | | |
| } | | |

FIG.8

| time_code(){ | No. of bits | Mnemonic |
|---|---|---|
| time_code_start_code | 32 | bslbf |
| do{ | | |
| data_ID | 8 | |
| if(data_ID=='V-Phase') | | |
| V-Phase | 8 | |
| if(data_ID=='H-Phase') | | |
| H-Phase | 8 | |
| if(data_ID=='VITC') | | |
| VITC | 72 | |
| if(data_ID=='LTC') | | |
| LTC | 72 | |
| if(data_ID=='Ancillary_data') | | |
| Ancillary_data | | |
| if(data_ID=='Audio_phase') | | |
| Audio_phase | 16 | |
| } | | |
| next_start_code() | | |
| } | | |

FIG.9

| Data ID | Data Type | Data Length |
|---|---|---|
| 00 | FORBIDDEN | |
| 01 | V − Phase | 1 Byte |
| 02 | H − Phase | 1 Byte |
| 03 | VITC | 9 Byte |
| 04 | LTC | 9 Byte |
| 05 | Ancillary Data | User defined |
| 06 | Audio Phase | 2 Byte |
| 07 | Reserved | |

FIG.12

| (a) encoder input | B1 | B2 | I | B3 | B4 | P1 | B5 | B6 | P2 |
|---|---|---|---|---|---|---|---|---|---|
| (b) time code | 1 | 2 | 3 | 4 | 5 | 6 | 7 | 8 | 9 |
| (c) decoder input | | | I | B1 | B2 | P1 | B3 | B4 | P2 | B5 | B6 |
| (d) time code | | | 1 | 2 | 3 | 4 | 5 | 6 | 7 | 8 | 9 |
| (e) decoder output | | | B1 | B2 | I | B3 | B4 | P1 | B5 | B6 | P2 |
| (f) time code | | | 1 | 2 | 3 | 4 | 5 | 6 | 7 | 8 | 9 |

FIG.13

| (a) encoder input | B1 | B2 | I | B3 | B4 | P1 | B5 | B6 | P2 |
|---|---|---|---|---|---|---|---|---|---|
| (b) time code | 1 | 2 | 3 | 4 | 5 | 6 | 7 | 8 | 9 |
| (c) decoder input | | | I | B1 | B2 | P1 | B3 | B4 | P2 | B5 | B6 |
| (d) time code | | | 3 | 1 | 2 | 6 | 4 | 5 | 9 | 7 | 8 |
| (e) decoder output | | | B1 | B2 | I | B3 | B4 | P1 | B5 | B6 | P2 |
| (f) time code | | | 1 | 2 | 3 | 4 | 5 | 6 | 7 | 8 | 9 |

FIG.14

ENCODED STREAM GENERATING APPARATUS AND METHOD, DATA TRANSMISSION SYSTEM AND METHOD, AND EDITING SYSTEM AND METHOD

This is a Divisional of application Ser. No. 09/317,329 U.S. Pat. No. 6,438,371 filed May 24, 1999 which is a Continuation of International Application PCT/JP98/04292 having an international filing date of Sep. 25, 1998.

BACKGROUND OF THE INVENTION

The present invention relates to an apparatus and method for generating an encoded stream having a time code for each picture from source data such as video data and/or audio data, a data transmission system and method for transmitting the encoded stream with the time code added thereto for each picture, and an editing system and method for editing data by use of the time code added to the encoded stream.

Recently, the technique for the MPEG (Moving Picture Experts Group) standard for compression-encoding of video data and audio data has been developed. A digital transmission system for transmitting compression-encoded data for broadcasting to a receiving end according to the MPEG standard has been proposed. A recording and reproduction system has also been proposed, in which the video data and audio data compression-encoded according to the MPEG standard are recorded in and reproduced from a storage medium such as a DVD (digital video disk) which is an optical disk capable of recording a large capacity of digital data.

Further, in applications employing a plurality of types of encoded streams (hereinafter sometimes referred to as the stream or streams) obtained by encoding video data and audio data and other data individually, the streams are integrated for transmission. A digital transmission system may be used in such a case. Specifically, in a digital data transmission system, a plurality of types of streams are multiplexed in a time division manner in a form suited to a stream transmission medium (storage medium and transmission path) so as to generate a transport stream which may be transmitted to the receiving end. At the receiving end, on the other hand, the transport stream from the transmitting end is received and demultiplexed into video or audio data and individually decoded.

The data (video data and audio data) handled in such a transmission system are generally accompanied by time information called a time code. The time code is time information defined by SMPTE, and means "Time And Control Data". Specifically, the time code is data representative of frames, seconds, minutes and hours.

In the digital data transmission system, time information may be managed based on a unique time concept such as STC (System Time Clock, which is reference time information), PTS (Presentation Time Stamp, which is time management information for reproduced output), DTS (Decoding Time Stamp, which is time management information for decoding), SCR (System Clock Reference, which is a time reference value) and PCR (Program Clock Reference, which is a time reference value for a program). In other words, the timings of an encoded stream encoded according to the MPEG standard is managed by time information which is completely different from the time code described above.

Specifically, in a baseband system in which baseband video data are handled and processed, the processing timings of the baseband video data are managed using the time code. On the other hand, in the encoding system for handling and processing an encoded stream, the processing timings are managed based on unique time information such as STC, PTS, DTS, SCR or PCR described above.

The stream encoded by the MPEG standard represents a sequence layer, a GOP (Group Of Picture) layer, a picture layer, a slice layer, a macroblock layer and a block layer. Also, according to the MPEG standard, a function called the group_of_picture_header( ) is defined for describing the header data of the GOP layer. As the header data of the GOP layer, this group_of_picture_header( ) function has data including a 32-bit group_start_code, a 25-bit time_code, a one-bit closed_gop and a one-bit broken_link. The group_start_code is the data for indicating the start of the group of picture header and a time code indicating the time taken from the head of the sequence of the head picture of the GOP. The closed_gop is flag data indicating that the image in the GOP can be reproduced independently of GOPs. The broken_link is flag data indicating that the B picture at the head in the GOP cannot be accurately reproduced for editing or the like.

The time_code described as header data of the GOP layer by the group_of_picture_header( ) function defined by the MPEG standard is data indicating the time code taken from the head of the sequence of the program transmitted. As such, the original time code of or attached to the original material data is not used. For example, if the original time code supplied from an external unit and attached to the head frame of the original material data is "01:30:00:00", once the head frame of the original material data is encoded, the time_code described as the header data of the GOP layer of the encoded stream becomes "00:00:00:00". Also, even when the original time code attached to each frame of the original material data is a discontinuous time code, the time_code described as the header data of the GOP layer of the encoded stream is a sequential time code. In other words, the original time code attached to the original material data is not always coincident with the time code described as the header data of the GOP layer of the encoded stream.

Also, the time_code described by the group_of_picture_header( ) function of the MPEG standard is data described as header data of the GOP layer. Therefore, according to the MPEG standard, the time code can be described only for each GOP. In other words, according to the MPEG standard, the time code can be transmitted for each GOP by describing the time code in the GOP layer of the encoded stream. Since the MPEG standard does not define or describe the time code for each frame (each picture), the time code cannot be transmitted for each picture.

As a result, the time code information is not attached for each picture in the encoded stream of the MPEG standard. Accordingly, if original material data is encoded according to the MPEG standard, the original time code attached to each frame of the original material data cannot be transmitted to the receiving end.

Consequently, the original time code attached to the original material data cannot be used for editing at the receiving end, nor may a recording medium be produced which is identical to a recording medium recorded with the original material data in a manner corresponding to the original time code.

OBJECTS AND SUMMARY OF THE INVENTION

An object of the present invention is to provide an apparatus and method for generating an encoded stream having time code information corresponding to that of the original material data for each picture (each frame), and a system and method for transmitting such encoded stream.

Another object of the present invention is to provide an editing system and method wherein an editing process may be performed at a receiving end by utilizing time code information corresponding to that of the original material data which was transmitted together with an encoded stream to the receiving end.

According to an aspect of the present invention, an apparatus is provided for generating an encoded stream from source video data, wherein the source video data represents a number of pictures or frames and includes original time code information corresponding to each picture or frame. The apparatus comprises an encoding device for encoding the source video data to generate the encoded stream having a number of layers including a picture layer, and a device for inserting the original time code information into a user data area of the picture layer of the encoded stream.

According to another aspect of the present invention, a data transmission system for transmitting source video data is provided. Such system comprises a data supply device operable with a first recording medium for storing source video data and time code information attached to the source video data, wherein the time code information is associated with each video frame of the source video data; an encoding device for generating an encoded stream having a plurality of layers generated by encoding the source video data, and for describing the time code information attached to each frame of the source video data into a picture layer among the plurality of layers; a transmission device for transmitting the encoded stream; a decoding device for decoding the encoded stream transmitted through the transmission means and extracting the time code information from the picture layer of the encoded stream by parsing the syntax of the encoded stream; and a data recording device for recording the data decoded by the decoding device and the time code information extracted by the decoding device in a manner associated with each other onto a second recording medium so as to obtain the same data as on the first recording medium.

According to another aspect of the present invention, an editing system for editing source video data is provided. Such system comprises a device for generating an editing list based on editing points set in the source video data; an encoding device for generating an encoded stream having a plurality of layers generated by encoding the source video data, wherein time code information attached to each frame of the source video data is described in a picture layer among the plurality of layers; a transmission device for transmitting the encoded stream; a decoding device for decoding the encoded stream transmitted through the transmission device and extracting the time code information from the picture layer of the encoded stream by parsing the syntax of the encoded stream; and an editing device for editing the video data decoded by the decoding device based on the time code information obtained by parsing the syntax of the encoded stream and the editing list.

According to another aspect of the present invention, an editing system for editing an encoded stream obtained by encoding source video data is provided. Such system comprises a device for generating an editing list based on editing points set in the source video data; an encoding device for generating an encoded stream having a plurality of layers generated by encoding the source video data, wherein time code information attached to each frame of the source video data is described in a picture area among the plurality of layers; and an editing device for editing the encoded stream based on the time code information obtained by parsing the syntax of the encoded stream and the editing list.

According to another aspect of the present invention, an editing system for editing an encoded stream is provided. Such system comprises a baseband system for generating an editing list based on editing points set by processing baseband source video data; and an encoding system for generating an encoded stream having a plurality of layers generated by encoding the source video data, wherein time code information attached to each frame of the source video data is described in a picture layer among the plurality of layers, and the encoded stream is edited at the stream level based on the time code information obtained by parsing the syntax of the encoded stream and the editing list generated in the baseband system.

In the present invention, data indicative of the time code of the source video data is arranged in a user data area of a picture layer of the encoded stream.

In the present invention, an encoded stream having the time code for each frame of the source video data in the picture layer of a plurality of layers maybe transmitted. The transmitted encoded stream may be decoded and by analyzing the syntax of the encoded stream, the time code may be extracted from the picture layer of the encoded stream, and the decoded data and the extracted time code information may be recorded in a recording medium in a manner associated with each other, thereby producing a recording medium having recorded therein the same data as the recording medium which supplied the data at the data supply side.

In the present invention, an editing list may be generated based on editing points set in the source video data and an encoded stream may be generated having the time code for each frame of the source video data in the picture layer of a plurality of layers and transmitted. The transmitted encoded stream may be decoded, the time code extracted from the picture layer of the encoded stream by analyzing the syntax of the encoded stream, and the decoded source video data edited based on the obtained time code and the editing list.

In the present invention, an editing list may be generated based on editing points set in the source video data and an encoded stream may be generated having the time code for each frame of the source video data in the picture layer of a plurality of layers. The encoded stream may be edited based on the editing list and the time code obtained by analyzing the syntax of the encoded stream.

In the present invention, an editing list may be generated based on editing points set by processing baseband source video data. Also, an encoded stream may be generated having the time code for each frame of the source video data described in the picture layer of a plurality of layers, and the encoded stream may be edited at a stream level based on the time code obtained by analyzing the syntax of the encoded stream and the generated editing list.

The above and other objects, features and advantages according to the present invention will be apparent from the following detailed description of the illustrated embodiments when read in conjunction with the accompanying drawings in which corresponding components are identified by the same reference numerals.

BRIEF DESCRIPTION OF THE DRAWINGS

FIG. 6 is a diagram showing the syntax of an encoded stream based on a MPEG standard;

FIG. 7 is a diagram of the syntax of a portion of FIG. 6;

FIG. 8 is a diagram of the syntax of a portion of FIG. 7;

FIG. 9 is a diagram showing the syntax of a portion of FIG. 8;

FIG. 12 is a diagram of a data identification code of the information described in the user data area of the picture layer;

FIG. 13 is a diagram to which reference will be made in explaining a first method of adding a time code to the encoded stream;

FIG. 14 is a diagram to which reference will be made in explaining a second method of adding a time code to the encoded stream;

DESCRIPTION OF THE PREFERRED EMBODIMENTS

An encoded stream generating apparatus and method according to an embodiment of the invention will now be described with reference to the accompanying drawings.

Figure 1:
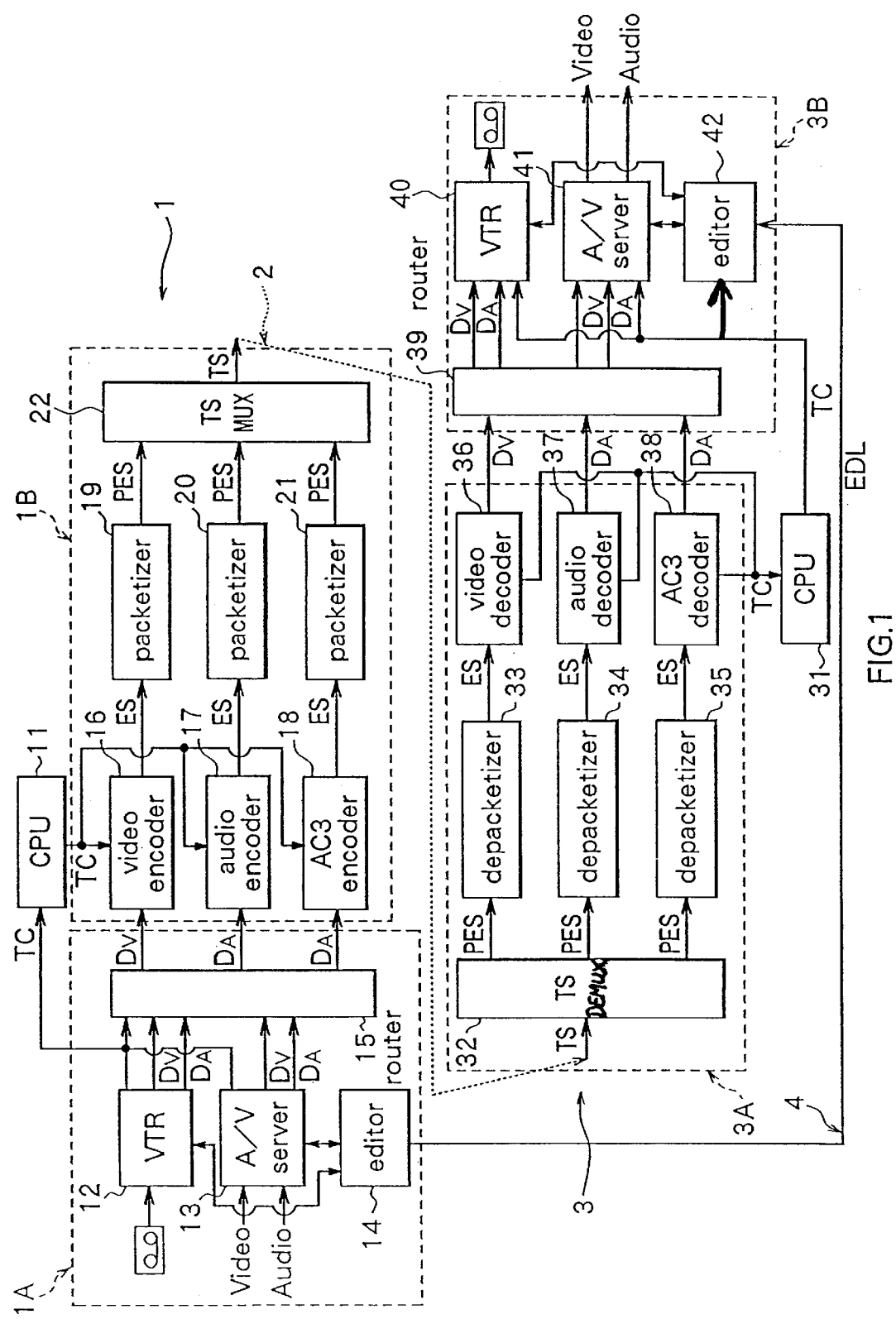
FIG. 1 is a diagram of a digital data transmission system having an encoded stream generating device according to an embodiment of the present invention.

FIG. 1 illustrates a digital data transmission system having an encoded stream generating apparatus according to an embodiment of the invention. The digital data transmission system of FIG. 1 includes a transmission system 1, a receiving system 3 and a transmission line 2 between them. Various forms of the transmission system 1 and the receiving system 3 may be possible. For example, the transmission system 1 may be a relay vehicle located in the field, and the receiving system 3 may be a main or local broadcasting station. As another example, the transmission system 1 may be a main broadcasting station, and the receiving system 3 may be a local station. The transmission system 1 and the receiving system 3 will be explained below.

The transmission system 1 generally includes a baseband system 1A for processing and handling baseband video data and baseband audio data, and an encoding system 1B for handling the encoded stream. The baseband video data and the baseband audio data referred to herein represent data which is not compression-encoded.

The baseband system 1A of the transmission system 1 may include a VTR 12 for receiving a tape having recorded therein original material data picked up by a video camera or the like in the field and reproducing the original data from the tape and recording information in the tape, an A/V server 13 having a randomly-accessible recording medium for reproducing the original material data from the randomly-accessible recording medium and recording information in the recording medium, an editor 14 for generating an editing list or edit decision list (EDL) using the original material data recorded in the tape of the VTR 12 and the recording medium of the A/V server 13, and a router 15 for routing video data DV and audio data DA reproduced from the VTR 12 and video data DV and audio data DA reproduced from the A/V server 13 and outputting them to a predetermined block.

The encoding system 1B of the transmission system 1 may include a video encoder 16 for encoding the video data DV supplied as original data according to a MPEG video standard and outputting a video elementary stream (video ES), an audio encoder 17 for encoding the audio data DA supplied as original data according to the MPEG standard and outputting an audio elementary stream (audio ES), an AC3 encoder 18 for encoding the audio data DA supplied as original data according to an AC3 standard and outputting a private elementary stream (private ES), packetizers 19, 20, 21 for respectively packetizing the elementary streams outputted from the video encoder 16, the audio encoder 17 and the AC3 encoder and outputting packetized elementary streams (PES), and a transport stream multiplexer (TSMUX) 22 for generating a transport stream (TS) by multiplexing the packetized elementary streams from the packetizers 19, 20, 21.

The digital data transmission system of FIG. 1 may further include a CPU 11 for controlling and managing each block of the baseband system 1A and the encoding system 1B. The CPU 11 receives the time code TC corresponding to each frame of the video data and the audio data reproduced from the VTR 12 or the A/V server 13, converts the time code TC into a predetermined format and supplies the same to the video encoder 16, the audio encoder 17 and the AC3 encoder.

On the other hand, the receiving system 3 of FIG. 1 may include a decoding system 3A for processing and handling the encoded stream, and a baseband system 3B for processing and handling decoded baseband video data and decoded baseband audio data.

The decoding system 3A of the receiving system 3 may include a transport stream demultiplexer (TSDEMUX) 32 for receiving the transport stream transmitted from the transmission system 1 through the transmission media 2 and demultiplexing it into a video packetized elementary stream (video PES), an audio packetized elementary stream (audio PES) and a private packetized elementary stream (private PES); depacketizers 33, 34, 35 for depacketizing the video packetized elementary stream, the audio packetized elementary stream and the private packetized elementary stream outputted from the transport stream demultiplexer 32 and outputting a video elementary stream (video ES), an audio elementary stream (audio ES) and a private elementary stream (private ES); a video decoder 36 for decoding the video elementary stream outputted from the depacketizer 36 and outputting baseband video data DV; an audio decoder 37 for decoding the audio elementary stream outputted from the depacketizer 34 and outputting baseband audio data DA; and an AC3 decoder 38 for decoding the private elementary stream outputted from the depacketizer 35 and outputting baseband audio data DA.

The baseband system 3B of the receiving system 3 may include a router 39 for receiving the video data DV outputted from the video decoder 36, the audio data DA outputted from the audio decoder 37 and the audio data DA outputted from the AC3 decoder 38 and routing them to a predetermined processing device; a VTR 40 for receiving the video data DV and the audio data DA outputted from the router 39 and recording them in a tape-like recording medium; an A/V server 41 for receiving the video data DV and the audio data DA outputted from the router 39 and recording them in a randomly-accessible recording medium; and an editor 42 for editing the video data DV and the audio data DA stored in the VTR 40 and the A/V server 41. Also, the video decoder 36, the audio decoder 37 and the AC3 decoder 38 may extract the time code information described in the elementary streams by analyzing the syntax of the respective elementary streams.

Further, the receiving system 3 may include a CPU 31 for controlling and managing the devices or circuits in the decoding system 3A and the baseband system 3B. This CPU 31 receives time code data TC outputted from the video decoder 36, the audio decoder 37 and the AC3 decoder 38, and may output the time code TC therefrom to the VTR 40, the A/V server 41 and/or the editor 42.

Devices or circuits of the transmission system 1 and the receiving system 2 will now be further described.

The VTR 12 and the A/V server 13 have recorded therein the baseband video data and the baseband audio data as original data. Further, the video data and the audio data recorded in the VTR 12 and the A/V server 13 are related to the original code for each frame. In other words, a time code is attached to or associated with each frame of the video data and the audio data.

The time code may be two types, that is, LTC (Longitudinal Time Code/Linear Time Code) and VITC (Vertical Interval Time Code). The LTC is a time code recorded in a time code track formed longitudinally of the tape. The VITC is a time code inserted in the vertical blanking period of the video signal. In the situation in which a reproduction head accesses the tape at high speed as in so-called shuttle reproduction, the time code may be read from the LTC. In the situation in which the reproduction head accesses the tape at very slow speed as in still reproduction, the time code may not be read from the LTC. However, the time code may be read from the VITC in the situation in which the reproduction head accesses the tape at very low speed, while the time code may not be read from the VTC in the situation in which the reproduction head accesses the tape at high speed. Accordingly, both LTC and VITC have advantages and disadvantages. Therefore, similar time code information may be recorded in the tape as LTC and VITC and, at the time of reproduction, the time code may be read as either LTC or VITC.

According to an embodiment of the present invention, the VTR 12 and the A/V server 13 have recorded therein two types of time codes, LTC and VITC, in a predetermined format. When reproducing the original video data and the original audio data from the VTR 12 and the A/V server 13, the time code TC corresponding to the particular original video data and the original audio data is outputted.

The editor 14 may access the original video data and the original audio data recorded in the VTR 12 and the A/V server 13, and set editing points such as an in-point and an out-point in the original video data and the original audio data. The in-point may be a time code indicating the edit starting point, and the out-point may represent the time code indicating the edit end point. When the editor sets a plurality of editing points in the original video data and the original audio data by operating the editor 14 in such a manner as to select only a desired scene or scenes, an editing list (EDL) may be generated in accordance with the set editing points. This editing list is simply a time code list based on the time code(s) of the set in-point(s) and the time code(s) of the set out-point(s). The video data DV and the audio data DA outputted from the A/V server 13 are not those edited according to this editing list, but the original video data and the original audio data not edited. In an embodiment of this invention, the original video data and the original audio data are edited according to an editing list generated by the editor 14, and the editing process for generating edited video data and edited audio data is performed by the editor 42 of the receiving system 3.

The router 15 is a circuit for routing the original video data DV and the original audio data DA reproduced from the VTR 12 and the A/V server 13 and supplying them to a predetermined processor. For example, the original video data DV is routed in such a manner as to be supplied to the video encoder 16, and the original audio data DA is routed in such a manner as to be supplied to the audio encoder 17 or the AC3 encoder 18.

The video encoder 16 is a circuit for generating an encoded stream (also called a video elementary stream) by compression-encoding the received original video data DV in accordance with the MPEG standard. Also, the video encoder 16 receives the original time code TC corresponding to the original video data DV from the CPU 11 for each frame, and describes or arranges the time code in a user data area of a picture layer of the encoded stream.

The audio encoder 17 is a circuit for generating an encoded audio stream (also called an audio elementary stream) by compression-encoding the received original audio data DA in accordance with the MPEG standard. Also, the audio encoder 17 receives the original time code TC corresponding to the original audio data DA for each frame from the CPU 11, and describes or arranges the time code TC in the encoded stream.

The AC3 encoder 18 is a circuit for generating an encoded private stream (also called a private elementary stream) by compression-encoding the received original audio data DA according to the AC3 standard. Also, the AC3 encoder 18 receives the original time code TC corresponding to the original audio data DA for each frame from the CPU 11, and describes or arranges the particular time code TC in the encoded stream.

The arrangement of the time code TC in the encoded stream will be more fully described hereinafter.

The packetizers 19, 20, 21 receive the video elementary stream outputted from the video encoder 16, the audio elementary stream outputted from the audio encoder 17 and the private elementary stream outputted from the AC3 encoder 17 and packetize them so as to have the form of a packetized elementary stream standardized for digital video broadcasting (DVB). The packetizer 19 outputs the packetized video elementary stream to the transport stream multiplexer 22 as a video packetized elementary stream; the packetizer 20 outputs the packetized audio elementary stream to the transport stream multiplexer 22 as an audio packetized elementary stream; and the packetizer 21 outputs the packetized private elementary stream to the transport stream multiplexer 22 as a private packetized elementary stream.

The transport stream multiplexer 22 decomposes or processes the video packetized elementary stream, the audio packetized elementary stream and the private packetized elementary stream into units of transport stream packets, and multiplexes the packets to generate a transport stream.

The transport stream demultiplexer 32 demultiplexes the transport stream transmitted through the transmission media 2 into the video packetized elementary stream, the audio packetized elementary stream and the private packetized elementary stream, outputs the video packetized elementary stream to the depacketizer 33, outputs the audio packetized elementary stream to the depacketizer 34, and outputs the private packetized elementary stream to the depacketizer 35.

The depacketizer 33 depacketizes the video packetized elementary stream and outputs the video elementary stream to the video decoder 36; the depacketizer 34 depacketizes the audio packetized elementary stream and outputs the audio elementary stream to the audio decoder 37; and the depacketizer 35 depacketizes the private packetized elementary stream and outputs the private elementary stream to the AC3 decoder 38.

The video decoder 36, prior to decoding the received video elementary stream, parses and analyzes the syntax of the video elementary stream. As a result of such, parsing and analyzing of the syntax of the encoded stream, encoding parameters such as the picture type, the prediction mode, the motion vector, the quantization step and the DCT mode described in the stream with the picture layer and the macroblock layer of the stream as data elements may be extracted from the encoded stream. The syntax of the encoded stream is analyzed so as to perform a decoding process which corresponds to the encoding process performed in the encoder. According to an embodiment of the present invention, when analyzing the syntax of the encoded stream, the time code described for each picture in the user data area of the picture layer is extracted. The video decoder 36, in accordance with the various encoding parameters extracted from the stream, decodes the encoded stream and supplies the decoded video data DV to the router 39. Further, the video decoder 36 supplies the time code TC to the CPU 31 for each frame extracted from the encoded stream.

The audio decoder 37, prior to decoding the received audio elementary stream, parses and analyzes the syntax of the audio elementary stream. As a result of such parsing and analyzing of the syntax of the encoded stream, the encoding parameters described in the stream may be extracted from the stream. According to an embodiment of the present invention, the time code information described in the encoded stream is extracted for each frame when analyzing the syntax of the particular encoded stream. The audio decoder 36 decodes the encoded audio stream in accordance with the encoding parameters extracted from the stream, and supplies the decoded audio data DA to the router 39. Further, the audio decoder 37 supplies the time code TC for each frame extracted from the encoded stream to the CPU 31.

The AC3 decoder 38, prior to decoding the received private elementary stream, parses and analyzes the syntax of the private elementary stream. As a result of such parsing and analyzing of the syntax of the encoded stream, the encoding parameters described in the stream may be extracted from the stream. According to an embodiment of the present invention, the time code information described in the encoded stream is extracted when analyzing the syntax of the particular encoded stream. The private decoder 38 decodes the encoded private stream in accordance with the encoding parameters extracted from the stream, and supplies the decoded audio data DA to the router 39. Further, the AC3 decoder 38 supplies the time code TC for each frame extracted from the encoded stream to the CPU 31.

The baseband video data DV or the baseband audio data DA outputted from video decoder 36, the audio decoder 37 and the AC3 decoder 38 are supplied to the VTR 40 or the A/V server 41 through the router 39.

The CPU 31 receives from the video decoder 36 the time code TC corresponding to each frame of the video data DV outputted from the video decoder 36, receives from the audio decoder 37 the time code TC corresponding to each frame of the audio data DA outputted from the audio decoder 37, and receives from the AC3 decoder 38 the time code TC corresponding to each frame of the audio data DA outputted from the AC3 decoder 38. Further, the CPU 31 supplies the VTR 40 and the A/V server 41 with the time code TC corresponding to the baseband video data DV and the baseband audio data DA supplied to the VTR 40 or the A/V server 41, based on the time code TC received from the video decoder 36, the audio decoder 37 and the AC3 decoder 38.

The VTR 40 or the A/V server 41, when recording the baseband video data DV and the baseband audio data DA supplied thereto from the router 39 in a recording medium, records the time code TC supplied from the CPU 31 by relating it to each frame of the video data DV and the audio data DA. As an example, consider the situation in which the video data DV and the audio data DA are recorded in a tape in the VTR 40. In such situation, the VITC contained in the time code TC supplied from the CPU 31 may be inserted in the blanking period of the video data DV and recorded in the slant tracks on the tape while at the same time recording the LTC contained in the time code TC supplied from the CPU 31 in the longitudinal tracks on the tape.

Consequently, the recording media of the VTR 40 and the A/V server 41 have recorded therein the video data, the audio data and time code which are respectively identical to the original video data, the original audio data and original time code recorded in the recording medium of the VTR 12 and the recording medium of the A/V server of the transmission system 1.

The editor 42 receives an editing list transmitted thereto by way of a telephone line or the like from the editor 14 of the transmission system 1, and in accordance with the editing list, edits the video data DV and the audio data DA recorded in the VTR 40 and the A/V server 41. However, even in the absence of the editing list from the editor 14 of the transmission system 1, similar editing processing may be performed in the editor 42 using the time code recorded in the VTR 40 and the A/V server 41, in view of the fact that the video data, the audio data and the time code recorded in the VTR 40 and the A/V server 41 are respectively identical to the original video data, the original audio data and the original time code recorded in the recording medium of the VTR 12 and the recording medium of the A/V server 13 of the transmission system 1.

In the MPEG transmission system previously described in the Background of the Invention section, the time code is not superposed for each frame on the encoded stream intended for transmission and, therefore, the time code is transmitted for each frame to the receiving end together with the encoded stream. However, in the digital data transmission system shown in FIG. 1, the original time code attached to the original material data is superposed for each frame at the transmitting end and, therefore, the original time code attached to the original material data can be reproduced at the receiving end. As a result, a recording medium may be generated at the receiving end which has recorded therein original material data and the same time code associated with each frame of the material data as that recorded in a recording medium at the transmitting end.

Thus, if the original time code recorded in the recording medium at the receiving end is used, the same editing process as at the transmitting end may be performed at the receiving end. Also, since the recording media at the transmitting end may be the same as those at the receiving end, the use of the editing list generated for the original material data at the transmitting end permits an editing process to be performed automatically at the receiving end.

Figure 2:
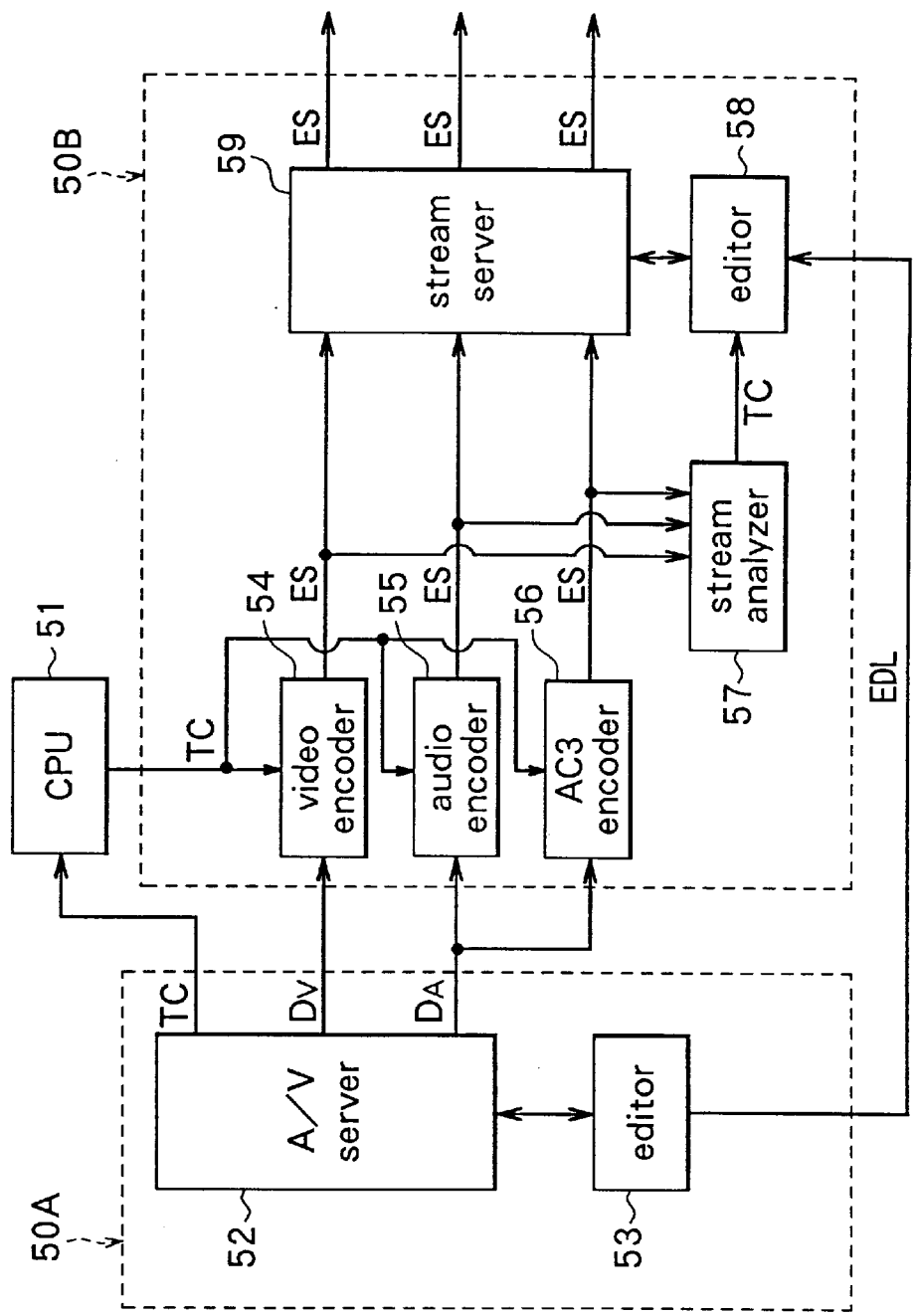
FIG. 2 is a diagram of a digital data processing system having an encoded stream generating device according to another embodiment of the present invention.

FIG. 2 illustrates a digital data processing system according to another embodiment of the present invention. The digital data transmission system of FIG. 1 is different from the digital data processing system of FIG. 2, in that, in the digital data transmission system of FIG. 1, the transmitted encoded stream is decoded in the receiving system 3 and after which the baseband video data and the baseband audio data are edited. On the other hand, in the digital data processing system of FIG. 2, the baseband video data and the baseband audio data in decoded form are not edited and instead the encoded stream is edited.

The digital data processing system of FIG. 2 may include a baseband system 50A for processing and handling the baseband video data and the baseband audio data and an encoding system 50B for handling the encoded stream.

The baseband system 50A in the digital data processing system of FIG. 2 may include an A/V server 52 for reproducing the original material data of the baseband from a randomly-accessible recording medium and an editor 53 for generating an editing list EDL using the original material data recorded in the recording medium of the A/V server 52.

The encoding system 50B of the digital data processing system of FIG. 2, on the other hand, may include a video encoder 54 for encoding baseband video data DV reproduced from the A/V server 52 according to the MPEG standard and outputting a video elementary stream; an audio encoder 55 for encoding baseband audio data DA reproduced from the A/V server 52 according to the MPEG standard and outputting an audio elementary stream; an AC3 encoder 56 for encoding baseband audio data DA reproduced from the A/V server 52 according to an AC3 standard and outputting an audio elementary stream; a stream analyzer 57 for parsing and analyzing the syntax of the elementary streams outputted from the video encoder 54, the audio encoder 55 and the AC3 encoder 56 and extracting the time code information described in the elementary streams; and a stream server 59 for recording the elementary streams outputted from the video encoder 54, the audio encoder 55 and the AC3 encoder 56 in a randomly-accessible recording medium.

The digital data processing system of FIG. 2 may further include a CPU 51 for controlling and managing the devices or circuits of the baseband system 50A and the encoding system 50B. Such CPU 51 receives the time code TC corresponding to each frame of the video data and the audio data reproduced from the A/V server 52, converts the received time code TC into a predetermined format and supplies it to the video encoder 54, the audio encoder 55 and the AC3 encoder 56.

The A/V server 52, like the A/V server 13 (FIG. 1), has recorded therein the baseband video data and the baseband audio data as original material data. Further, the video data and the audio data are recorded in the recording media as data associated with the original time code for each frame. Also, the A/V server 52 has recorded therein two types of time code, such as LTC and VITC, in a predetermined format. In the case where the original video data and the original audio data are reproduced from the A/V server 52, the original time code TC corresponding to each frame of the particular original video data and the particular original audio data, respectively, may be outputted.

The editor 53 accesses the original video data and the original audio data recorded in the A/V server 52, and sets editing points including an in-point and an out-point in the original video data and the original audio data. The editing operator operates the editor 53 so as to set an editing section defined by a plurality of in-points and out-points so that the editing operator can select a desired scene or scenes in the original video data and the original audio data. Then, an editing list (EDL) is generated in accordance with the set in-points and the out-points. The video data DV and the audio data DA outputted from the A/V server 52 are not edited by this editing list, but are the new-edited original video data and the original audio data, respectively. However, according to an embodiment of this invention, the original video data and the original audio data are actually edited in accordance with the editing list generated by the editor 53, and the editing process for generating the edited video data and the edited audio data is performed by the editor 58.

The video encoder 54 is a circuit for generating an encoded stream (also called a video elementary stream) by compression-encoding the received original video data DV according to the MPEG standard. Also, the video encoder 54 receives the original time code TC corresponding to the original video data DV for each frame from the CPU 51, and inserts or arranges the particular time code TC as a data element in the picture layer of the encoded stream.

The audio encoder 55 is a circuit for generating an encoded audio stream (also called an audio elementary stream) by compression-encoding the received original audio data DA according to the MPEG standard. Also, the audio encoder 55 receives the original time code TC corresponding to the original audio data DA for each frame from the CPU 51, and inserts or arranges the particular time code TC in the encoded stream.

The AC3 encoder 56, on the other hand, is a circuit for generating an encoded private stream (also called a private elementary stream) by compression-encoding the received original audio data DA according to the AC3 standard. Also, the AC3 encoder 56 receives the original time code TC corresponding to the original audio data DA for each frame from the CPU 51, and inserts or arranges the particular time code TC in the encoded stream for each frame.

The location in the encoded stream at which the original time code is inserted will be described hereinafter.

The stream analyzer 57 parses and analyzes the syntax of the elementary streams respectively supplied from the video encoder 54, the audio encoder 55 and the AC3 encoder 56. The stream analyzer 57 extracts the time code information for each frame (or picture) described in the user data area of the picture layer by parsing and analyzing the syntax of the elementary streams supplied thereto as described above. The stream analyzer 57 supplies the editor 58 with the time code TC corresponding to each frame (picture) of the elementary streams supplied to the stream server 59.

The editor 58 manages the recording and reproduction timing of the stream server 59 and the recording addresses of the data on the recording media. The editor 58 receives the time code TC extracted from the elementary stream by the stream(s) analyzer 58, generates a write address corresponding to the time code TC, and supplies the write address to the stream server 59. Specifically, the editor 58 may include a memory in the form of a table for relating an encoded stream recorded in the recording medium of the stream server 59 and the time code attached to the frame thereof to each other. By utilizing this table, the address of the recording medium of the stream server 59 where the encoded stream corresponding to the desired time code is stored may be determined. Also, the editor 58 receives an editing list from the editor 53 in the baseband system and controls the reproduction of the stream server 59 based on the recording address in the memory previously described and the editing list. Specifically, the recording and reproduction of the stream server is controlled in such a manner as to reproduce the stream between the in-point and the out-point specified by the editing list from the stream server 59. As a result, the editing stream outputted from the stream server 59 constitutes a stream corresponding to the editing list generated in the editor 53.

As described above, in the digital data processing system of FIG. 2, an encoded stream may be edited as it is in accordance with the editing list generated in the baseband system 50A.

The editing program containing the edited video data and the edited audio data outputted from the A/V server 41 of the digital data transmission system of FIG. 1 is baseband data. Therefore, this editing program, when transmitted to other transmission lines, may have to be coded again. However, in the digital data processing system of FIG. 2, the editing stream outputted from the stream server 59 has the state of an encoded stream, and therefore can be transmitted to a transmission medium without additional encoding. As a result, the digital data processing system of FIG. 2 may prevent the deterioration of the image quality which otherwise might be caused by repetitive encoding processing.

Figure 3:
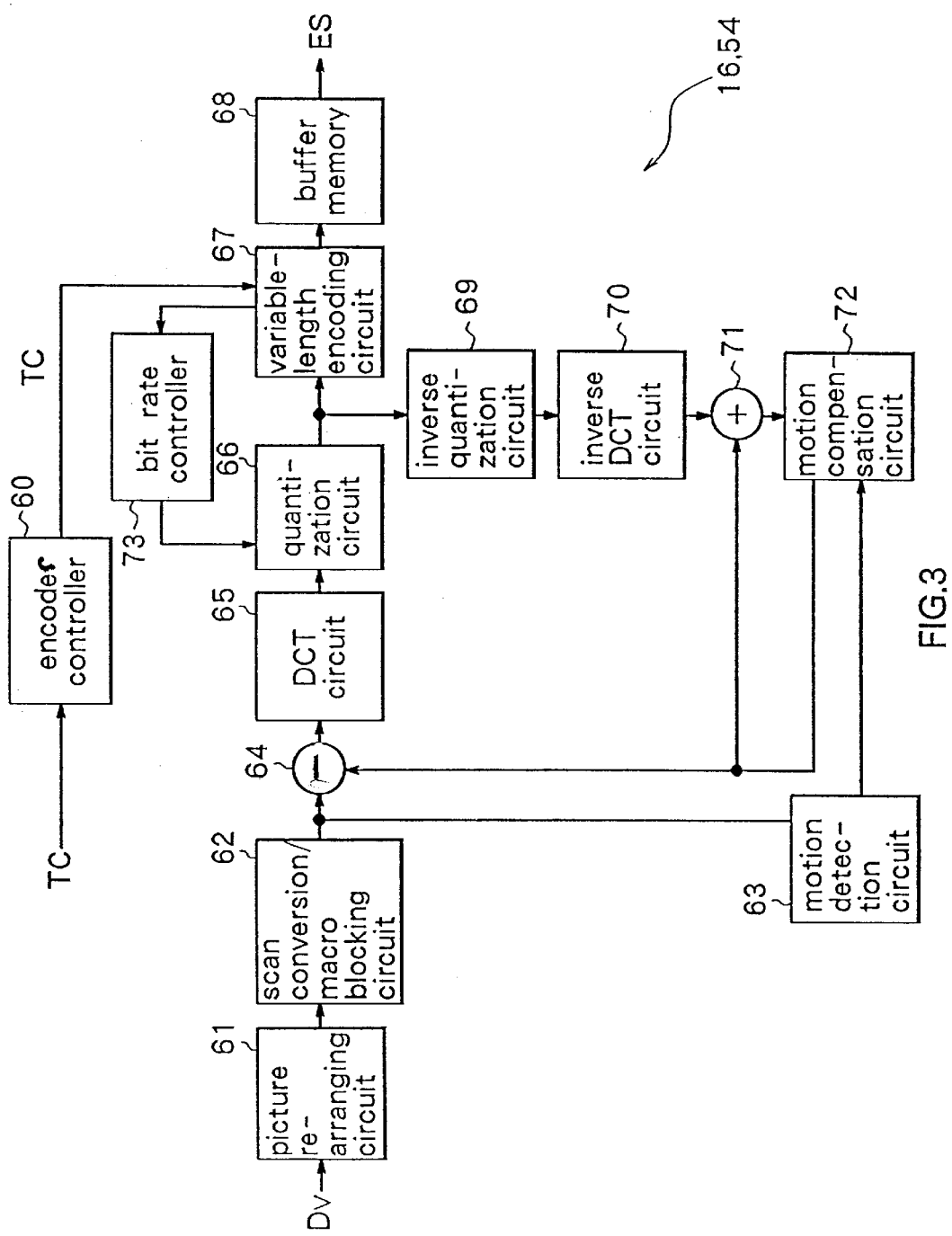
FIG. 3 is a diagram of a video encoder of the systems of FIGS. 1 and 2.

FIG. 3 illustrates an example of a configuration of the video encoders 16, 56. Each of the video encoders 16, 56 may include an encoder controller 60 for controlling and managing all the devices or circuits in the video encoder, an image rearranging circuit 61 for receiving the baseband video data DV and rearranging the I picture (intra encoded picture), the P picture (predictive encoded picture) and the B picture (bidirectionally predictive encoded picture) in the order of encoding, a scan conversion/macro blocking circuit 62 supplied with the outputted data of the image rearranging circuit 61 for determining a frame structure or a field structure and performing a scan conversion and forming macro blocks of 16×16 pixels corresponding to the result of the determining, a motion detection circuit 63 for detecting and outputting motion vector data based on the output data of the scan conversion/macro blocking circuit 62, a subtraction circuit 64 for determining the difference between the output data of the scan conversion/macro blocking circuit 62 and the predictive image data, a DCT circuit 65 for performing discrete cosine transformation (DCT) of the output data of the subtraction circuit 64 by block and outputting a DCT coefficient, a quantization circuit 66 for quantizing the output data of the DCT circuit 65, a variable-length encoding circuit 67 for converting the output data of the quantization circuit 66 into a variable length code, and a buffer memory 68 for temporarily holding the output data of the variable-length encoding circuit 67 and outputting it as a video elementary stream (ES).

Each of the video encoders 16, 54 may further include an inverse quantization circuit 69 for inversely quantizing the output data of the quantization circuit 66, an inverse DCT circuit 70 for performing inverse DCT of the output data of the inverse quantization circuit 69, an adder circuit 71 for adding the output data of the inverse DCT circuit 70 and the predictive image data to each other and outputting the sum, a motion compensation circuit 72 for holding the output data of the adder circuit 71, compensating the motion based on the motion vector and outputting the predictive image data to the subtraction circuit 64 and the adder circuit 71, and a bit rate control unit 73 for controlling a target bit rate by controlling the quantization characteristic of the quantization circuit 66 based on the bit rate data generated from the variable-length encoding circuit 67.

The image rearranging circuit 61 receives the baseband video data DV and rearranges the pictures in the order of encoding under the control of the encoder controller 60. The data with the pictures thereof rearranged in a new order are supplied to the scan conversion/macro blocking circuit 62. The scan conversion/macro blocking circuit 62 may perform scan conversion processing and may form macro blocks from the frame/field data, based on the prediction mode of the data supplied thereto. The motion detection circuit 63 detects the motion vector from the output data of the scan conversion/macro blocking circuit 62, and outputs the motion vector data thus detected.

In the case where the supplied video data is encoded as an I picture, the output data of the scan conversion/macro blocking circuit 62 is directly inputted to the DCT circuit 65 for DCT operation, so that the DCT coefficient is quantized by the quantization circuit 66 and supplied to the variable length encoding circuit 67, without taking the difference with the predictive image data in the subtraction circuit 64.

In the case where the supplied video data is encoded as a P picture, predictive image data may be generated by the motion compensation circuit 72 based on the image data corresponding to the past I or P picture held in the motion compensation circuit 72 and the motion vector supplied from the motion detection circuit 63, and the generated predictive image data are outputted to the subtraction circuit 64 and the adder circuit 71. Also, the subtraction circuit 64 takes the difference between the output data of the scan conversion/macro blocking circuit 62 and the predictive image data supplied from the motion compensation circuit 72. The difference is subjected to DCT processing by the DCT circuit 65 so as to obtain DCT coefficient data which is quantized by the quantization circuit 66. The quantized data are supplied to the variable-length encoding circuit 67.

In the case where the supplied video data are encoded as a B picture, the predictive image data may be generated by the motion compensation circuit 72 based on data of two images corresponding to the past and future I or P picture held in the motion compensation circuit 72 and two motion vectors supplied from the motion detection circuit 63, and the generated predictive image data are outputted to the subtraction circuit 64 and the adder circuit 71. Also, the subtraction circuit 64 takes the difference between the output data of the scan conversion/macro blocking circuit 62 and the predictive image data supplied from the motion compensation circuit 72. The difference thereof is subjected to DCT processing by the DCT circuit 65 so as to obtain DCT coefficient data which is quantized by the quantization circuit 66. The quantized data are supplied to the variable-length encoding circuit 67.

The encoder controller 60 may supply the variable-length encoding circuit 67 with various encoding parameters defined in the MPEG standard such as the picture type, the prediction mode, the motion vector, the quantization step and the DCT mode, and may supply the variable-length encoding circuit 67 with the time code TC from the CPU 11 at the same time. The encoding parameters are data elements which may be described as or inserted in a sequence layer, a GOP layer, a picture layer, a slice layer, and a macroblock layer.

The variable-length encoding circuit 67 subjects the data quantized by the quantization circuit 66 to variable-length encoding and, at the same time, in accordance with the encoding data subjected to the variable-length encoding and the various encoding parameters supplied from the encoder controller 60, describes appropriate data and data elements in the sequence layer, the GOP layer, the picture layer and the macroblock layer so as to generate an encoded stream. In generating this encoded stream, the variable-length encoding circuit 67 describes or inserts the time code TC supplied from the encoder controller 60 in the user data area of the picture layer so as to generate an encoded stream with the time code information added (superposed) for each picture.

As described above, an encoded video elementary stream may be generated having original time code information for each frame of the original video data.

Figure 4:
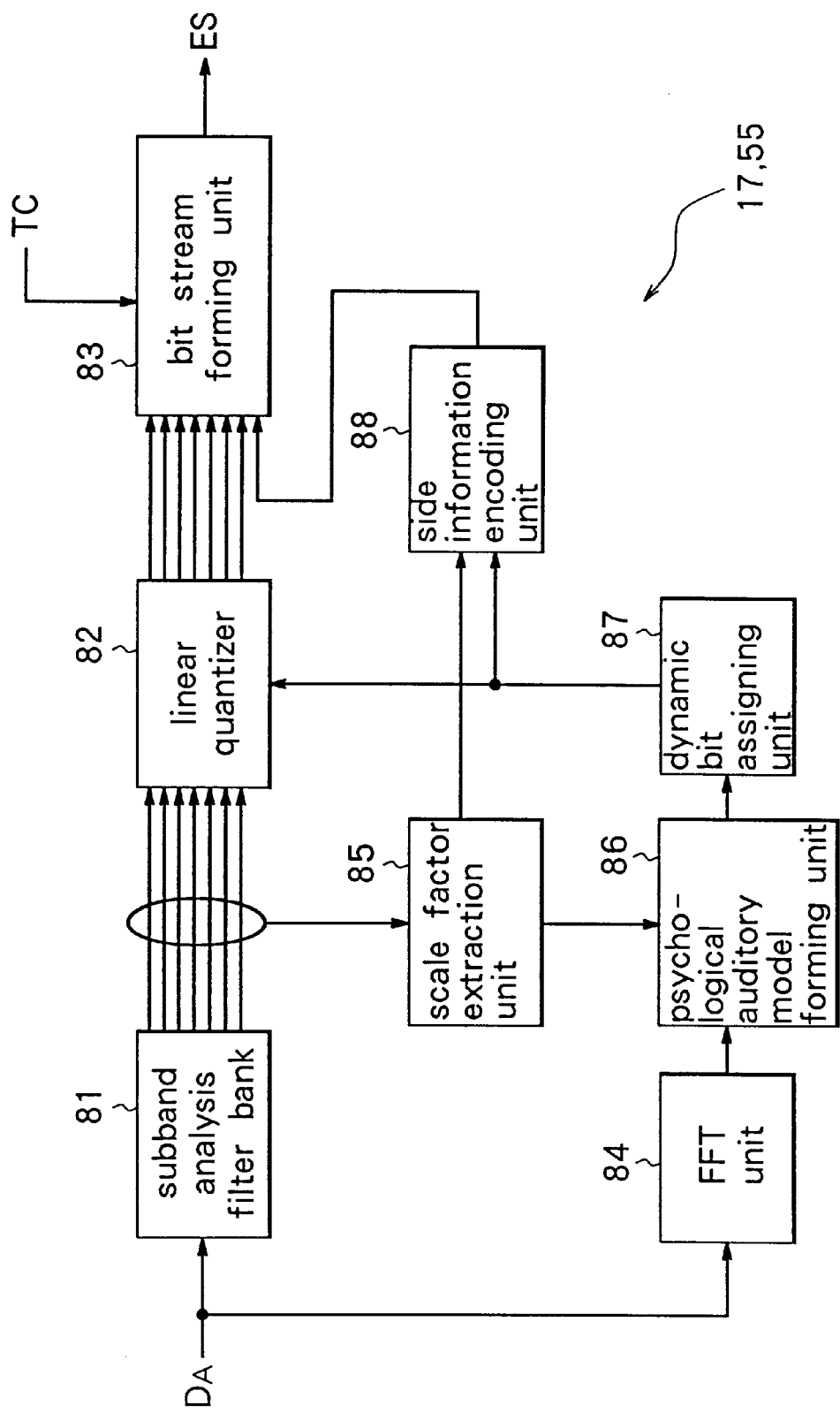
FIG. 4 is a diagram of an audio encoder of the systems of FIGS. 1 and 2.

FIG. 4 illustrates an example of a configuration of the audio encoders 17, 55 shown in FIGS. 1 and 2, respectively. Each of the audio encoders 17, 55 may include a subband analysis filter bank 81 supplied with the baseband audio data DA for splitting it into 32-band subband signals and outputting the same, a linear quantizer 82 for quantizing each output signal of the subband analysis filter bank 81, and a bit stream forming unit 83 for generating encoded audio data based on each output signal of the linear quantizer 82, while at the same time adding an error check for CRC (cyclic redundancy check), the encoded side information to be described hereinafter, the time code data TC from the CPU 11, and so forth to the encoded audio data so as to form a bit stream having a predetermined data structure and outputting it as an audio elementary stream (ES).

Each of the audio encoders 17, 55 may further include a FFT unit 84 for conducting Fast Fourier Transformation (FFT) of the audio data DA inputted thereto, a scale factor extraction unit 85 for extracting a scale factor from each output signal of the subband analysis filter bank 81, a psychological auditory model forming unit 86 for forming a psychological auditory model for psychological auditory analysis using an output signal of the FFT unit 84 and the scale factor extracted by the scale factor extraction unit 85, a dynamic bit assigning unit 87 for dynamically assigning bits based on the psychological auditory model formed by the psychological auditory model forming unit 86 and supplying the bit assignment information to the linear quantizer 82 so as to control the quantization characteristic of the linear quantizer 82, and a side information encoding unit 88 for encoding the scale factor extracted by the scale factor extraction unit 85 and the bit assignment information from the dynamic bit assigning unit 87 as side information and supplying the encoded side information to the bit stream forming unit 83.

The subband analysis filter bank 81 receives the baseband audio data DA, splits the audio data DA into 32-band subband signals, and outputs the subband signals to the linear quantizer 82. The FFT unit 84, on the other hand, receives the baseband audio data DA, subjects the audio data DA to Fast Fourier Transformation and supplies the obtained signal to the psychological auditory model forming unit 86.

The scale factor extraction section 85 extracts a scale factor from each output signal of the subband analysis filter bank 81, and supplies the extracted scale factor information to the psychological auditory model forming unit 86. The psychological auditory model forming unit 86 forms a psychological auditory model for psychological auditory analysis using the output signal of the FFT unit 84 and the scale factor information extracted by the scale factor extraction unit 85.

The dynamic bit assigning unit 87 dynamically assigns bits based on the psychological auditory model generated by the psychological auditory model forming unit 86, and generates a control signal for controlling the quantization characteristic of the linear quantizer 82. The quantization characteristic of the linear quantizer 82 is controlled by the quantization characteristic control signal supplied from the dynamic bit assigning unit 87. The output signal of the linear quantizer 82 is supplied to the bit stream forming unit 83.

The side information encoding unit 88 codes the scale factor extracted by the scale factor extraction unit 85 and the bit assignment information supplied from the dynamic bit assigning unit 87 as side information, and supplies it to the bit stream forming unit 83.

The bit stream forming unit 83 generates encoded audio data using each output signal of the linear quantizer 82 while at the same time adding an error check and the side information encoded by the side information encoding unit 88 to the encoded audio data. Further, the bit stream forming unit 83 adds the time code data TC from the CPU 11, 51 to the encoded audio data and forms a bit stream having a predetermined data structure. As a result, an audio elementary stream with a time code added thereto is generated.

Figure 5:
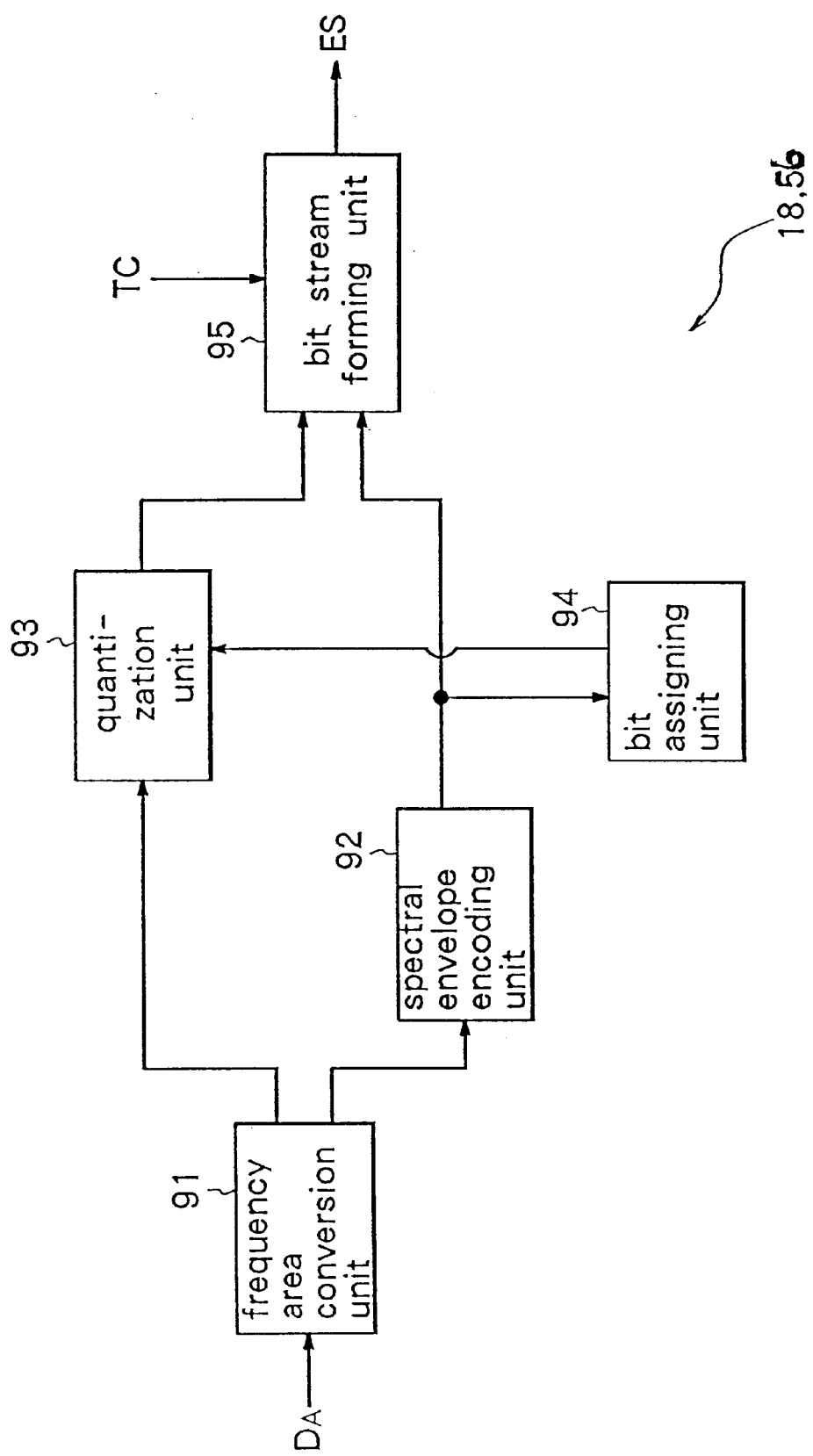
FIG. 5 is a diagram of a configuration of the AC3 encoder shown in FIGS. 1 and 2.

FIG. 5 illustrates an example of a configuration of the AC3 encoders 18, 56 shown in FIGS. 1 and 2, respectively. Each of the AC3 encoders 18, 56 may include a frequency area conversion unit 91 for receiving the baseband audio data DA, converting it into frequency area data and outputting a frequency coefficient including an exponent part and a mantissa. The exponent part of the frequency coefficient represents the spectral envelope of the audio data. Each of the AC3 encoders 18, 56 may further include a spectral envelope encoding unit 92 for encoding the exponent part of the frequency coefficient outputted from the frequency area conversion unit 91, a quantization unit 93 for quantizing the mantissa of the frequency coefficient outputted from the frequency area conversion unit 91, a bit assigning unit 94 for assigning bits based on the output data of the spectral envelope encoding unit 92 and supplying the bit assignment information to the quantization unit 93 so as to control the quantization characteristic of the quantization unit 93, and a bit stream forming unit 95 for adding the time code data TC from the CPU 11, 51 to the output data of the spectral envelope encoding unit 92 and the output data of the quantization unit 93 to form a bit stream having a predetermined data structure and outputting it as a private elementary stream (ES).

The frequency area conversion unit 91 converts the baseband audio data DA supplied thereto to the frequency area, processes the same so as to form a frequency coefficient having an exponent part and a mantissa, outputs the mantissa of the frequency coefficient to the quantization unit 93, and outputs the exponent part of the frequency coefficient to the spectral envelope encoding unit 92.

The spectral envelope encoding unit 92 encodes the exponent part of the frequency coefficient supplied from the frequency area conversion unit 91 and outputs the encoded data to the bit assigning unit 94 and the bit stream forming unit 95.

The quantization unit 93 quantizes the mantissa of the frequency coefficient supplied from the frequency area conversion unit 91, and outputs the quantized data to the bit stream forming unit 95.

The bit assigning unit 94 assigns bits based on the output encoded data of the spectral envelope encoding unit 92, and outputs the bit assignment information to the quantization unit 93. The quantization characteristic of the quantization unit 93 is controlled based on the bit assignment information from the bit assigning unit 94.

The bit stream forming unit 95 receives the time code data TC from the CPU 11, 51 and adds the particular time code data TC to the output data of the spectral envelope encoding unit 92 and the output data of the quantization unit 93.

As a result of the above-described processing, a bit stream having a predetermined data structure may be formed and outputted as a private elementary stream (ES). Such private elementary stream has the time code added thereto.

A structure of a stream encoded according to the MPEG standard with time code data added thereto will now be described.

FIG. 6 is a diagram of the syntax of a video stream based on MPEG. The video encoders 16, 54 may generate an encoded stream according to such syntax. Additionally, the video decoder 36 (FIG. 1) may extract a plurality of significant data items (data elements) from the encoded bit stream by analyzing the encoded stream in accordance with the syntax of FIG. 6. In the syntax of FIG. 6 which will be described hereinbelow, functions and conditional statements are expressed in thin letters, and data elements are expressed in thick letters. The data elements are described by Mnemonics indicating the name, the bit length and bit type and the order of transfer thereof.

Initially, the functions used in the syntax of FIG. 6 will be explained. The syntax of FIG. 6 may be used for extracting predetermined significant data from the transmitted encoded stream at the video decoder. The syntax used by the video encoder is the one in which conditional statements such as "if" and "while" statements are omitted from the syntax of FIG. 6.

The next_start_code( ) function described first in video_sequence( ) is a function for searching for the start code described in the bit stream. The encoded stream generated in accordance with the syntax of FIG. 6 has described therein the data elements defined by the sequence_header( ) function and the sequence_extension( ) function. This sequence_header( ) function is for defining the header data of the sequence layer of the MPEG bit stream, and the sequence_extension( ) function is for defining the extension data of the sequence layer of the MPEG bit stream.

The "do { } while" syntax arranged next to the sequence_extension( ) function is a syntax indicating that the data elements described based on the function in { } of the "do" statement are described in the encoded data stream during the time when the condition defined by the "while" statement is true. The nextbits( ) function used for this "while" statement is for comparing the bit or bit string described in the bit stream with the data elements referred to. In the case of the syntax of FIG. 6, the nextbits( ) function is used for comparing the bit string in the bit stream with the sequence_end_code indicating the end of the video sequence, and when the bit string in the bit stream fails to coincide with the sequence_end_code, the condition of the "while" statement becomes true. Consequently, the "do { } while" syntax arranged next to the sequence_extension( ) function indicates that the data elements defined by the function in the "do" statement are described in the encoded bit stream during the period when the sequence_end_code indicating the end of the video sequence fails to appear in the bit stream.

In the encoded bit stream, the data elements defined by the extension_and_user_data(0) function are described next to each data element defined by the sequence_extension( ) function. This extension_and_user_data(0) function is for defining the extension data and the user data in the sequence layer of the MPEG bit stream.

The "do { } while" syntax arranged next to the extension_and_user_data(0) function is a function indicating that the data elements described based on the function in { } of the "do" statement is described in the bit stream during the period when the condition defined by the "while" statement is true. The nextbits( ) function used in this "while" statement is a function for judging whether the bit or bit string appearing in the bit stream coincides with the picture_start_code or the group_start_code, and in the case where the bit or the bit string appearing in the bit stream coincides with the picture_start_code or the group_start_code, the condition defined by the "while" statement is true. As a result, the "do { } while" syntax indicates that in the case where the picture_start_code or the group_start_code appears in the encoded bit stream, the code of the data elements defined by the function in the "do" statement is described next to the start code.

The "if" statement described first in the "do" statement indicates the condition where the group_start_code appears in the encoded bit stream. In the case where the condition of this "if" statement is true, the data elements defined by the group_of_picture_header( ) function and the extension_and_user_data(1) function are sequentially described next to the group_start_code in the encoded bit stream.

The above-mentioned group_of_picture_header( ) function is a function for defining the header data of the GOP layer of the MPEG encoded bit stream, and the extension_and_user_data(1) function is for defining the extension data and the user data of the GOP layer of the MPEG encoded bit stream.

Further, in this encoded bit stream, the data elements defined by the picture_header( ) function and the picture_coding_extension( ) function are described next to the data elements defined by the group_of_picture_header( ) function and the extension_and_user_data(1) function. Of course, in the case where the condition of the "if" statement explained above is not true, the data elements defined by the group_of_picture_header( ) function and the extension_and_user_data(1) function are not described. Therefore, the data elements defined by the picture_header( ) function, the picture_coding_extension( ) function and the extension_and_user_data(2) function are described next to the data elements defined by the extension_and_user_data(0) function.

The picture_header( ) function is a function for defining the header data of the picture layer of the MPEG encoded bit stream, and the picture_coding_extension( ) function is a function for defining the first extension data of the picture layer of the MPEG encoded bit stream.

The extension_and_user_data(2) function is a function for defining the extension data and the user data of the picture layer of the MPEG coded bit stream. The user data defined by the extension_and_user_data(2) function may be described or inserted in the picture layer for each picture. In accordance with the present invention, the time code information is described or arranged as the user data defined by this extension_and_user_data(2) function.

In the encoded bit stream, the data elements defined by the picture_data( ) function are described next to the user data of the picture layer. This picture_data( ) function is a function for describing the data elements for the slice layer and the macroblock layer.

The "while" statement described next to the picture_data( ) function is a function for determining the condition of the next "if" statement while the condition defined by this "while" statement is true. The nextbits( ) function used in this "while" statement is a function for determining whether the picture_start_code or the group_start_code is described or not in the encoded bit stream, and in the case where the picture_start_code or the group_start_code is described in the bit stream, the condition defined by this "while" statement becomes true.

The next "if" statement is a conditional statement for determining whether or not the sequence_end_code is described in the encoded bit stream, and in the case where the sequence_end_code is not so described, indicates that the data elements defined by the sequence_header( ) function and the sequence_extension( ) function are described. The sequence_end_code is a code indicating the end of a sequence of the encoded bit stream. Until the encoded stream ends, the data elements defined by the sequence_header( ) function and the sequence_extension( ) function are described in the encoded stream.

The data elements described by the sequence_header( ) function and the sequence_extension( ) function are the same as the data elements described by the sequence_header( ) function and the sequence_extension ( ) function described at the head of the sequence of the video stream. In this way, the same data are described in the stream to prevent the situation in which in the case where the bit stream receiver starts the receiving operation midway of the data stream (for example, the bit stream portion corresponding to the picture layer), data of the sequence layer cannot be received and the stream cannot be decoded.

The 32-bit sequence_end_code indicating the end of the sequence is described next to the data elements defined by the last sequence_header( ) function and the sequence_extension( ) function, that is, at the end of the data stream.

The sequence_header( ) function, the sequence_extension( ) function, the extension_and_user_data(0) function, the group_of_pictures_header( ) function and the extension_and_user_data(1) function will now be further explained.

The data elements defined by the sequence_header( ) function may include a sequence_header_code, sequence_header_present_flag, horizontal_size_value, vertical_size_value, aspect_ratio_information, frame_rate_code, bit_rate_value, marker_bit, VBV_buffer_size_value, constrained_parameter_flag, load_intra_quantizer_matrix, intra_quantizer_matrix, load_non_intra_quantizer_matrix and non_intra_quantizer_matrix.

The sequence_header_code is data indicating the start sync code of the sequence layer. The sequence_header_present_flag is data indicating whether the data in the sequence_header is valid or not. The horizontal_size_value is data which may include the low-order 12 bits of the number of pixels in the horizontal direction of the picture. The vertical_size_value is data which may include the low-order 12 bits of the number of vertical lines of the picture. The aspect_ratio_information is data indicating the aspect ratio (the ratio between longitudinal and lateral lengths) of the pixels or the display screen. The frame_rate_code is data indicating the picture display period. The bit_rate_value is data of the low-order 18 bits (rounded to each 400 bsp) of the bit rate for limiting the amount of bits generated. The marker_bit is bit data inserted for preventing start code emulation (that is, the false detection of a start code). The VBV_buffer_size_value is the low-order 10 bit data of the value for determining the size of a virtual buffer (video buffer verifier) for controlling the amount of code generated. The constrained_parameter_flag is data indicating that each parameter is within the constraint. The load_intra_quantizer_matrix is data indicating the presence of the quantization matrix data for intra MB. The intra_quantizer_matrix is data indicating the value of the quantization matrix for intra MB. The load_non_intra_quantizer_matrix is data indicating the presence of the quantization matrix data for non-intra MB. The non_intra_quantizer_matrix is data indicating the value of the quantization matrix for non-intra MB.

The data elements defined by the sequence_extension( ) function may include an extension_start_code, extension_start_code_identifier, sequence_extension_present_flag, profile_and_level_indication, progressive_sequence, chroma_format, horizontal_size_extension, vertical_size_extension, bit_rate_extension, vbv_buffer_size_extension, low_delay, frame_rate_extension_n and frame_rate_extension_d and so forth.

The extension_start_code is data indicating the start sync code of the extension data. The extension_start_code_identifier is data indicating which extension data is sent. The sequence_extension_present_flag is data indicating whether the data in the sequence extension is valid or not. The profile_and_level_indication is data for specifying the profile and level of the video data. The progressive_sequence is data for indicating that the video data are sequentially scanned. The chroma_format is data for specifying the color difference format of the video data. The horizontal_size_extension is the high-order 2-bit data added to the horizontal_size_value of the sequence header. The vertical_size_extension is the high-order 2-bit data added to the vertical_size_value of the sequence header. The bit_rate_extension is the high-order 12-bit data added to the bit_rate_value of the sequence header. The vbv_buffer_size_extension is the high-order 8-bit data added to the vbv_buffer_size_value of the sequence header. The low_delay is data indicating that no B picture is included. The frame_rate_extension_n is data for obtaining the frame rate in combination with the frame_rate_code of the sequence header. The frame_rate_extension_d is the data for obtaining the frame rate in combination with the frame_rate_code of the sequence header.

The extension_and_user_data(i) function does not describe the data elements defined by the extension_data ( ) function but only the data elements defined by the user_data( ) function if (i) is other than 2. As a result, the extension_and_user_data(0) function describes only the data elements defined by the user_data( ) function.

The data elements defined by the group_of_pictures_header( ) function include the group_start_code, group_of_picture_header present_flag, time_code, closed_gop and broken_link.

The group_start_code is data indicating the start sync code of the GOP layer. The group_of_picture_header_present_flag is data indicating whether the data elements in the group_of_pictures_header are valid or not. The time_code indicates the time from the head of the sequence of the leading picture of the GOP. The closed_gop is flag data indicating that the picture in the GOP is reproducible independently of other GOPs. The broken_link is flag data indicating that the B picture at the head in the GOP cannot be reproduced correctly for editing or the like.

The extension_and_user_data(1) function, like the extension_and_user_data(0) function, is for describing only the data elements defined by the user_data( ) function.

The picture_header( ) function, the picture_coding_extension( ) function, the extensions_and_user_data(2) and the picture_data( ) for describing the data elements for the picture layer of the encoded stream will now be further described.

The data elements defined by the picture_header( ) function include picture_start_code, temporal_reference, picture_coding_type, vbv_delay, full_pel_forward_vector, forward_f_code, full_pel_backward_vector, backward_f_code, extra_bit_picture and extra_information_picture.

The picture_start_code is data indicating the start sync code of the picture layer. The temporal_reference is the number indicating the order of picture display and the data reset at the head of the GOP. The picture_coding_type is data indicating the picture type. The vbv_delay is data indicating the initial state of the virtual buffer at the time of random access. The full_pel_forward_vector is data indicating whether the accuracy of the forward motion vector is in units of an integer or a half pixel. The forward_f_code is data indicating the motion vector search area in a forward direction. The full_pel_backward_vector is data indicating whether the accuracy of the reverse motion vector is in units of an integer or a half pixel. The backward_f_code is data indicating the motion vector search area in a reverse direction. The extra_bit_picture is a flag indicating the presence of the succeeding additional information. For example, when this extra_bit_picture is "1", it indicates it is followed by the extra_information_picture, and when the extra_bit_picture is "0", it indicates the absence of the succeeding data. The extra_information_picture is reserved information according to the standard.

The data elements defined by the picture_coding_extension( ) function may include an extension_start_code, extension_start_code_identifier, f_code[0][0], f_code[0][1], f_code[1][0], f_code[1][1], intra_dc_precision, picture_structure, top_field_first, frame_predictive_frame_dct, concealment_motion_vectors, q_scale_type, intra_vlc_format, alternate_scan, repeat_first_field, chroma_420_type, progressive_frame, composite_display_flag, v_axis, field_sequence, sub_carrier, burst_amplitude and sub_carrier_phase.

The extension_start_code is a start code indicating the start of the extension data of the picture layer. The extension_start_code_identifier is the code indicating which extension data is sent. The f_code[0][0] is data indicating the horizontal motion vector search area in a forward direction. The f_code[0][1] is data indicating the vertical motion vector search area in a forward direction. The f_code[1][0] is data indicating the horizontal motion vector search area in a backward direction. The f_code[1][1] is data indicating the vertical motion vector search area in a backward direction. The intra_dc_precision is data indicating the accuracy of the DC coefficient. The picture_structure is data indicating a frame structure or a field structure. In the case of field structure, it also indicates whether a high-order field or a low-order field is involved. The top_field_first is data indicating whether the first field is high or low in the case of the frame structure. The frame_predictive_frame_dct is data indicating that the prediction of the frame mode DCT is limited to the frame mode in the case of the frame structure. The concealment_motion_vectors is data indicating that the intra macroblock is accompanied by a motion vector for hiding a transmission error. The q_scale_type is data indicating which of a linear quantization scale or a nonlinear quantization scale is used. The intra_vlc_format is data indicating whether another two-dimensional VLC is used for the intra macroblock. The alternate_scan is data indicating which of a zig-zag scan or an alternate scan was selected or used. The repeat_first_field is the data used for the 2:3 pull-down. The chroma_420_type is data indicating that it has the same value as the progressive_frame when the signal format is 4:2:0, and it is zero otherwise. The progressive_frame is data indicating whether this picture has been successfully scanned sequentially or not. The composite_display_flag is data indicating whether the source signal has been a composite signal or not. The v_axis is a data used only when source bitstream represents a signal that had previously been encoded according to PAL system. The field_sequence is a data defining the number of the field in the eight field sequence used in PAL systems or the four field sequence used in NTSC systems. The sub_carrier is a data indicating relationship between sub_carrier and line frequency. The burst_amplitude is a data defining the burst amplitude for PAL or NTSC. The sub_carrier_phone is a data defining the phase of reference sub_carrier at the field-synchronization data.

The extension_and_user_data(2) function, as shown in FIG. 7, describes the data elements defined by the extension_data( ) function in the case where the extension_start_code exists in the encoded bit stream. In the absence of the extension_start_code in the bit stream, however, the data elements defined by the extension_data( ) are not described in the bit stream. In the case where the user_data_start_code exists in the bit stream, the data elements defined by the user_data( ) function are described next to the data elements defined by the extension_data( ) function.

The user_data( ) function, as shown in FIG. 8, is a function for describing the data elements such as the user_data_start_code, the time_code( ) function and the user_data.

The user_data_start_code is a start code for indicating the start of the user data area of the picture layer of the MPEG bit stream. The "while" syntax described next to the user_data_start_code is true as long as 24-bit data including 23 0s and the succeeding 1 does not appear in the encoded bit stream. That is, such 24-bit data including the 23 0s followed by 1 may be attached to the head of all the start codes and, as a result, the positions of all the start codes can be found in the encoded bit stream by having the start code(s) arranged behind such 24 bits.

The time_code( ) function is a function for describing the time code. Specifically, as shown in FIG. 9, data elements described by the time_code( ) function may include a time_code_start_code indicating the start code for recognizing the position where the time code is described in the user data area of the picture layer, a data_ID indicating the identification code of the data following the start code, and time code data corresponding to the data identification code.

Figures 11A, 11B:
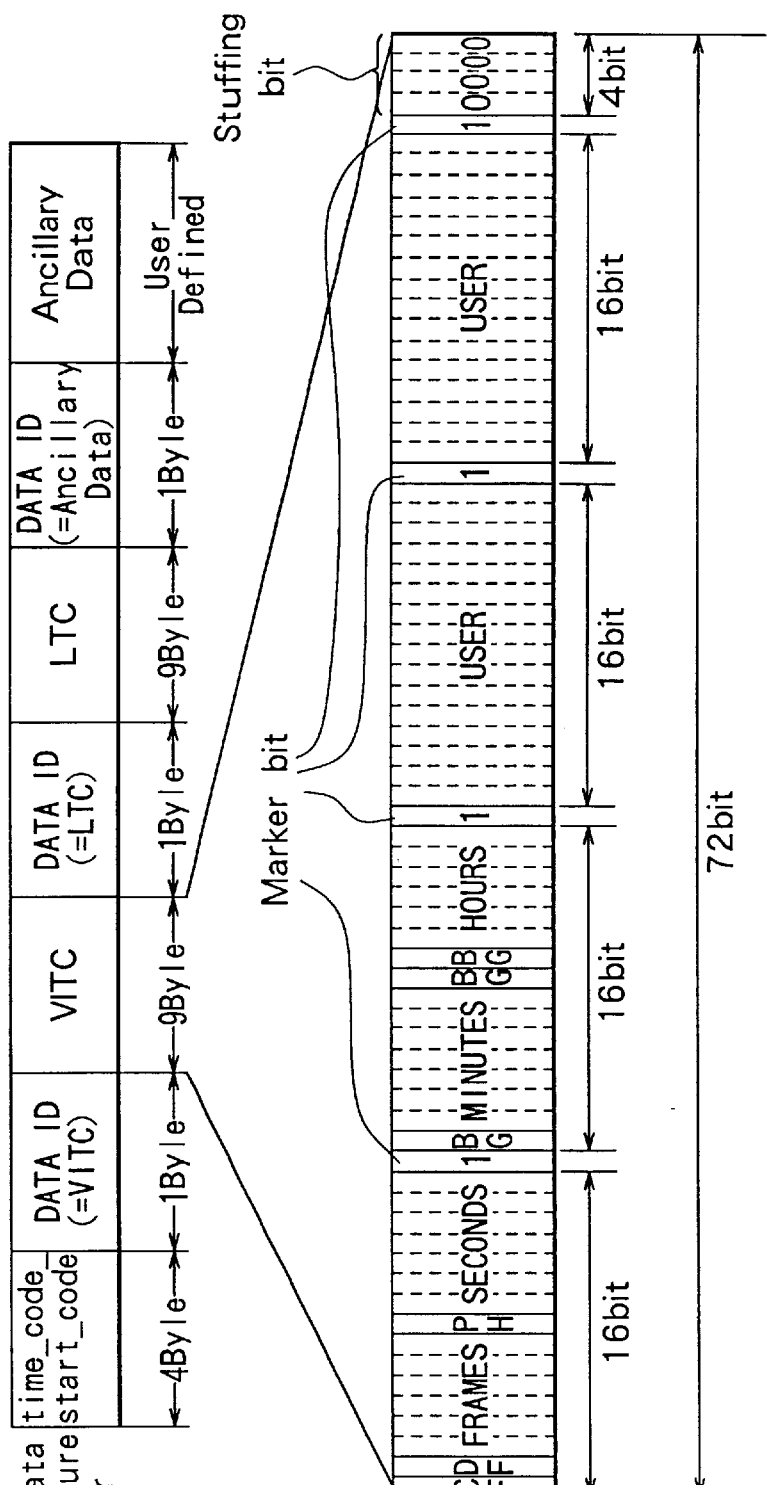
FIGS. 11A and 11B are diagrams of the data structure of time code information described in a user data area of a picture layer.

In the time_code( ) function of the present invention, as shown in FIGS. 11A and 11B, if the data identification code data_ID is an ID code indicating the VITC, the 72-bit VITC is described next to it. Also, in the case where the data identification code data_ID is the ID code indicating the LTC, the 72-bit LTC is described next to it. The data elements described by the time_code( ) function will be further described hereinafter.

The data elements defined by the picture_data ( ) function are those defined by the slice( ) function. In the case where a slice_start_code indicating the start code of the slice( ) function is absent in the bit stream, however, the data elements defined by this slice( ) function are not described in the bit stream.

The slice( ) function is for describing the data elements for the slice layer and, specifically, for describing data elements such as slice_start_code, slice_quantiser_scale_code, intra_slice_flag, intra_slice, reserved_bits, extra_bit_slice, extra_information_slice and extra_bit_slice and the data elements defined by the macroblock( ) function.

The slice_start_code is a start code indicating the start of the data elements defined by the slice( ) function. The slice_quantiser_scale_code is data indicating the quantization step size set for the macroblock existing in the slice layer. In the case where the quantiser_scale_code is set for each macroblock, however, the data of macroblock_quantiser_scale_code set for each macroblock may be used in a priority manner. The intra_slice_flag is a flag indicating whether the intra_slice and reserved_bits are present in the bit stream. The intra_slice is data indicating whether the non-intra macroblock is present in the slice layer or not. In the case where any one of the macroblocks in the slice layer is a non-intra macroblock, the intra_slice is "0", while in the case where all the macroblocks in the slice layer are non-intra macroblocks, the intra_slice is "1". The reserved_bits are 7-bit data and assumes the value "0". The extra_bit_slice is a flag indicating that additional information exists in the encoded stream and, when the extra_information_slice is present, it is set to "1". In the absence of the additional information, it is set to "0".

The macroblock( ) function is for describing the data elements for the macroblock layer and, specifically, is for describing data elements such as a macroblock_escape, macroblock_address_increment and macroblock_quantiser_scale_code, and the data elements defined by the macroblock_modes( ) function and the macroblock_vectors(s) function.

The macroblock_escape is a fixed bit string indicating whether the horizontal difference between a reference macroblock and the preceding macroblock is not less than 34 or not. In the case such horizontal difference is not less than 34, 33 is added to the value of the macroblock_address_increment. The macroblock_address_increment is data indicating the difference in the horizontal direction between the reference macroblock and the preceding macroblock. If there exists a macroblock_escape before the macroblock_address_increment, the sum of 33 and the value of the macroblock_address_increment is the data indicating the horizontal difference between an actual reference macroblock and the preceding macroblock. The macroblock_quantiser_scale_code is the quantization step size set for each macroblock. The slice_quantizer_scale_code indicates the quantization step size of the slice layer and is set in each slice layer. In the case where the macroblock_quantiser_scale_code is set for the reference macroblock, however, this quantization step size is selected.

The structure of the stream generated by the syntax explained with reference to FIGS. 6 to 9 will now be further explained with reference to FIG. 10.

Figure 10:
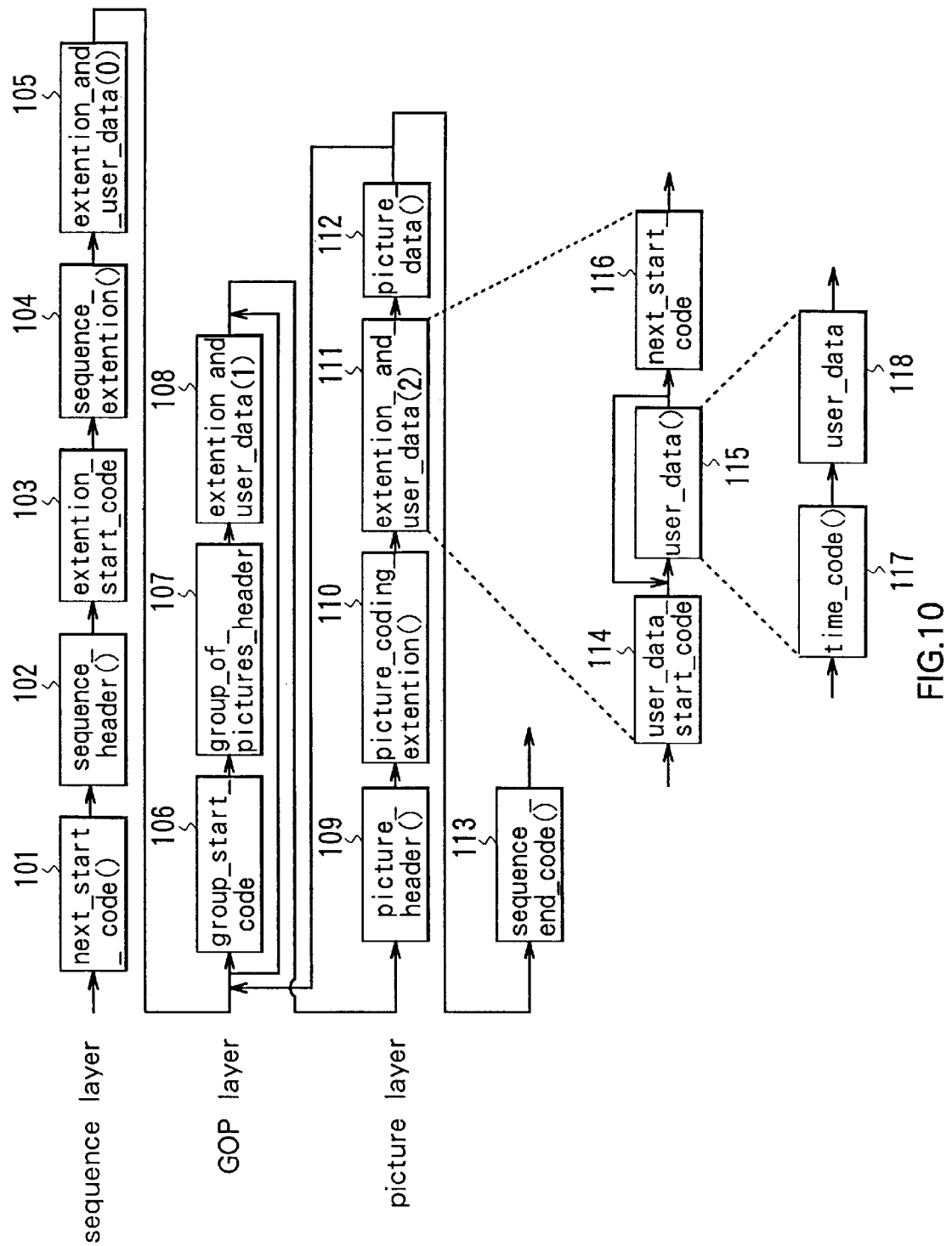
FIG. 10 is a diagram to which reference will be made in explaining the data structure of an encoded stream according to a MPEG standard.

FIG. 10 illustrates data structure of a MPEG encoded stream. As shown in FIG. 10, the data structure of a video elementary stream may include at least the sequence layer, the GOP layer and the picture layer.

The sequence layer may have the data elements defined by the next_start_code( ) function 101, the sequence_header( ) function 102, the extention_start_code 103, the sequence_extention( ) function 104 and the extention_and_user_data(0) function 105. The GOP layer may have the data elements defined by the group_start_code 106, the group_of_pictures_header( ) function 107 and the extention_and_user_data(1) function 108. The picture layer may have the data elements defined by the picture_header( ) function 109, the picture_coding_extention( ) function 110, the extention_and_user_data(2) function 111 and the picture_data function 112. The sequence_end_code 113 is described at the end of the video sequence.

The extention_and_user_data(2) function 111 contains the data elements defined by the user_data_start_code 114, the user_data( ) function 115 and the next_start_code 116. With regard thereto, reference is made to the syntax explained above with reference to FIG. 7.

The user_data( ) function 115 contains the data elements defined by the time_code( ) function 117 and the user_data 118. With regard thereto, reference is made to the syntax explained above with reference to FIG. 8.

The data elements described by the time_code ( ) function will now be further explained with reference to FIGS. 11A and 11B.

FIG. 11A illustrates an example of the VITC, the LTC and the ancillary data in the user area of the picture layer. FIG. 11B illustrates the data structure of the 72-bit VITC or LTC.

As shown in FIG. 11A, the ID code data_ID of the data recorded in the user data area is described next to the 32-bit time_code_start_code. This ID code data_ID may be preset or configured in accordance with the values shown in FIG. 12. If the data_ID indicates "03", for example, the VITC is described in the next 72 bits. In the case where the data_ID indicates "04", on the other hand, the LTC is described in the next 72 bits.

In FIG. 11B, the "CF" in the first bit indicates a color frame, and the "DF" in the second bit represents a drop frame. The six bits from the third to the eighth bit indicate the "frame" portion of the time code, the ninth bit indicates the phase correction, and the 7 bits from the 10th to the 16th bit indicate the "seconds" portion of the time code. The character "1" in the 17th, 34th, 51st and 68th bits is a marker bit to prevent a successive appearance of 23 zeros. By inserting a marker bit at predetermined intervals in this way, start code emulation can be prevented.

The characters "BG" of the 18th bit, 26th bit and 27th bit indicate a binary group. The seven bits from the 19th to the 25th bit indicate the "minutes" portion in the time code, and the six bits from the 28th to the 33rd bit indicates the "hour" portion of the time code.

The 16 bits from the 35th to the 50th bit and the 16 bits from the 52nd to the 67th bit are reserved for permitting the user to describe a desired user data. The last four bits are stuffing bits for aligning the byte or bytes.

An explanation of a method of adding a time code to the encoded stream based on the MPEG standard will now be provided.

In a video elementary stream, the pictures are rearranged for the convenience of encoding. Two methods may be utilizing for adding the time code to the video elementary stream. In the description that follows, the period (M) at which the I picture or P picture appears is assumed to be 3.

FIG. 13 refers to a first method of adding the time code to the video elementary stream. In FIG. 13, (a) indicates the picture type in the input video data of the video encoder 16. Characters I, P, and B designate the I picture, the P picture and the B picture, respectively. The attached numerical characters designate the order of the pictures of each picture type. FIG. 13(b), shows, in simplified fashion, the time code attached to each picture. According to the first method, the time code is added to the video elementary stream without taking the rearrangement of the picture into account, and the time code is attached again at the time of reproduction. More specifically, and with reference to FIG. 1, once the CPU 11 has acquired a time code, the time code is recorded directly taking into consideration the time delay before it is recorded in the user data 115 (FIG. 10). The picture type and the time code added at the time of input to the video decoder 36 according to this first method are shown in FIGS. 13(c) and (d). When the time code is added by the first method, the video decoder 36 attaches the time code, which may be inputted with the I or P picture to the first next B picture, and the time code which may be inputted with the particular B picture to the second next B picture. Also, the time code inputted with the second B picture is attached to the I or P picture. FIGS. 13(e) and 13(f) show the picture types and the time codes of the output video data of the video decoder 23 in such a case.

FIG. 14 refers to a second method of adding a time code to a video elementary stream. In FIG. 14, (a) designates the picture types in the input video data of the video encoder 16, and (b) designates the time codes, in simplified fashion, inputted with each picture. According to the second method, the time code is added to the video elementary stream taking the picture rearrangement into account, and the time code is not attached again at the time of reproduction. When the CPU 11 (FIG. 1) has acquired the time code, the CPU rearranges and records it while rearranging the picture to assure the same correspondence between the picture and the time code before and after the picture rearrangement in view of the delay before the time code is recorded in the user data 115 (FIG. 10). FIGS. 14(c) and 14(d) illustrate the picture types and the time codes inputted to the video decoder 23 in which the time code is added according to the second method. In the case where the time code is added according to the second method, the video decoder 36 rearranges the time code like the picture to assure correspondence between each picture and the time code. The picture types and the time codes of the output video data of the video decoder 36 for this case are shown in FIGS. 14(e) and 14(f).

A method of adding a time code to the audio elementary stream will now be described.

Figure 15:
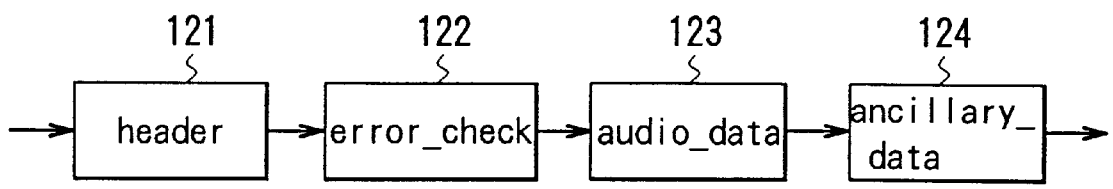
FIG. 15 is a diagram to which reference will be made in explaining the data structure of the audio elementary stream according to a MPEG standard.

FIG. 15 is representative of the data structure of the audio elementary stream according to the MPEG audio standard. As shown in FIG. 15, an audio elementary stream may include a number of data elements such as, from the head thereof, a header (header) 121, an error check (error_check) 122, audio data (audio_data) 123, and an ancillary data (ancillary_data)124.

The ancillary data 124 may represent an area which corresponds to each frame (audio frame) as a unit of decoding and reproduction and in which arbitrary data can be recorded in the data structure of the audio stream shown in FIG. 15.

The audio encoded stream, unlike the video stream, may have a size for each frame fixed by the bit rate. The amount of data for each frame may be 384×bit rate÷sampling frequency. The data amount in the area of the ancillary data 124 may be equal to the data amount of one frame less the data amount actually used in each area of the header 121, the error check 122 and the audio data 123.

According to this embodiment, the time code is recorded in the area of the ancillary data 124 of the audio elementary stream shown in FIG. 15. The method of describing or inserting the time code in the ancillary data 124 is the same as that for describing or inserting the time code in the user data area explained with reference to FIGS. 11A and 11B. A 16-bit audio_phase (audio phase information) may be described, in addition to the time code such as VITC or LTC, in the area of the ancillary data 124 of the audio encoded stream. In the case where the time_code_start_code in the ancillary data 124 is followed by the data_ID as an ID code indicating the audio phase information, then, the audio_phase is described in the next two bytes. This audio phase information is data for indicating the phase difference between the audio frame and the video frame since the audio frame may not be synchronized with the frame in the video stream (hereinafter referred to as the "video frame").

Figure 16:
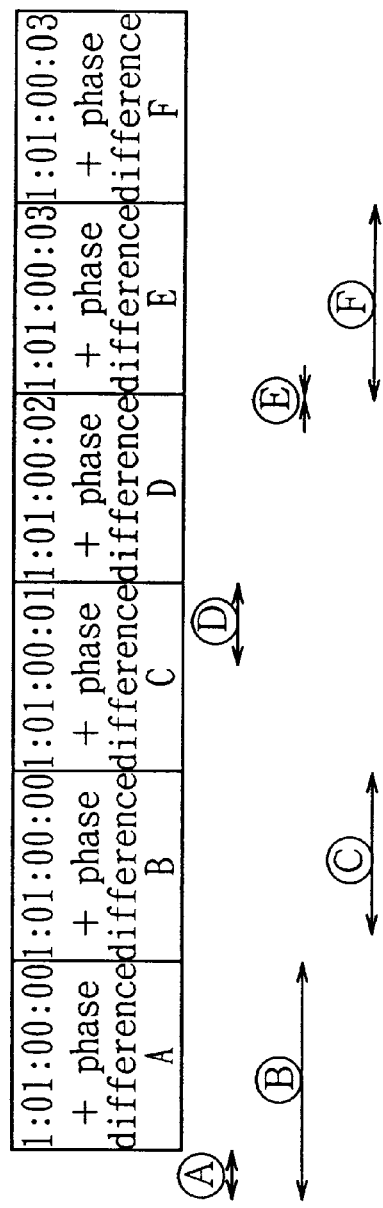
FIGS. 16A and 16B are diagrams to which reference will be made in explaining the phase difference between the video frame and the audio frame.

The phase difference between the video frame and the audio frame will now be explained with reference to FIGS. 16A and 16B. FIG. 16A shows video frames in which each block represents one video frame. The numerals in the figure show the time codes corresponding to the respective video frames. FIG. 16B, on the other hand, shows the audio frames in which each block represents one audio frame and in which the numerals designate the time codes recorded which correspond to the respective video frames. As seen from FIGS. 16A and 16B, the audio frames are not synchronized with the video frames. According to this embodiment, the time lag between the time code recorded in each audio frame and the actual starting point of the audio frame is regarded as a phase difference (designated by characters A to F in FIG. 16B), and the phase difference for each audio frame is described as audio phase information, together with the time code, in the encoded stream. This audio phase information may be expressed as the number of samples of the audio data.

Figure 17:
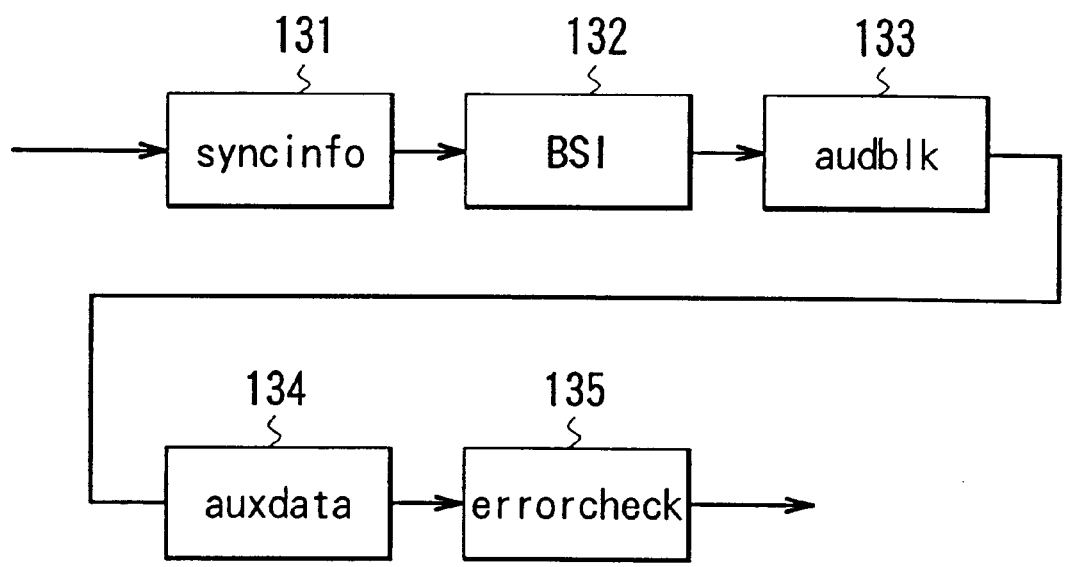
FIG. 17 is a diagram to which reference will be made in explaining the data structure of an AC3 stream according to an AC3 standard.

A method of adding the time code to the AC3 stream constituting a private elementary stream will now be explained. FIG. 17 indicates the data structure of the AC3 stream according to the AC3 standard. As shown in FIG. 17, the data structure of the AC3 stream has areas of, from the head thereof, sync information (syncinfo) 131, bit stream information (BSI) 132, an audio block (audblk) 133, auxiliary data (auxdata) 134 and an error check (error-check) 135 in that order.

The area of the auxiliary data 134 may exist for each frame (sync frame) as a unit of decoding and reproduction and may be where arbitrary data can be recorded in the data structure of the AC3 stream. The amount of data in the area of the auxiliary data 134 may be equal to the data amount left after the data amount used in the areas other than that of the auxiliary data 134 is taken from the data amount of one frame.

According to this embodiment, the time code (including the user bits) is recorded in the area of the auxiliary data 134 of the data structure of the AC3 stream shown in FIG. 17. The method of describing or inserting the time code in the auxiliary data 134 may be the same as that for describing or inserting the time code in the ancillary data 124 of the audio encoded stream.

As explained above, according to the present invention, time code information may be recorded in an area which can exist for each unit of decoding and reproduction and in which arbitrary data can be recorded in the data structure of the stream. Specifically, the time code for a video elementary stream may be recorded in the area of the user data 115 (FIG. 10), the time code for an audio elementary stream may be recorded in the area of the ancillary data 124 (FIG. 15), and the time code for an AC3 stream may be recorded in the area of the auxiliary data 134 (FIG. 17). As a result, according to the present invention, the time code attached to the material data can be accurately transmitted as a signal corresponding to the stream for each unit of decoding and reproduction.

Also, according to the present invention, time code information may be attached to each of a video stream, an audio stream and an AC3 stream. As a result, even in the case where the streams are separated as in the receiving system 3 (FIG. 1), no stream lacks the time code information. This is very advantageous because the time information is not lost even in the case where each stream is stored, for example, in a hard disk and reused.

Further, according to the present invention, the time code including the user bits can be recorded in each of the video stream, the audio stream and the AC3 stream. Therefore, arbitrary information recorded as the user bits can also be transmitted accurately as a signal corresponding to each stream.

According to the present invention, which is not limited to the aforementioned embodiments, the format in which the time code information is attached to the video elementary stream, the audio elementary stream and the private elementary stream (AC3 stream) is not limited to that shown in the embodiments but other appropriate formats may also be utilized.

As described above, in an encoded stream generating device or method according to this invention, the time code attached to the material data may be recorded in an area which can exist for each unit of decoding and reproduction and in which arbitrary data can be recorded in the data structure of the encoded stream. Therefore, the time code attached to the material data can be accurately transmitted as a signal corresponding to the encoded stream for each unit of decoding.

In an encoded stream generating device or method according to another aspect of this invention, an encoded stream may be generated in which the time code attached to each frame of the source video data is described in the picture layer of a plurality of layers constituting the encoded stream. As a result, an encoded stream can be generated in which the time code attached to the original material data is described or inserted for each picture.

In an encoded stream generating device or method according to still another aspect of this invention, an encoded stream may be generated in which data elements indicating the time code attached to the source video data are described or inserted in the user data area of the picture area of the encoded stream, thereby leading to the advantage that an encoded stream can be generated in which the time code attached to the original material data is described or inserted in a manner corresponding to each picture.

In a data transmission system or method according to this invention, an encoded stream may be generated in which the time code attached to each frame of the source video data is described or inserted in the picture layer of a plurality of layers at the transmitting end, and this encoded stream is transmitted. At the receiving end, the encoded stream is decoded, and by analyzing the syntax of the encoded stream, the time code is extracted from the picture layer of the encoded stream, and the decoded data and the extracted time code information which are related to each other may be stored in a recording medium. In this way, a recording medium may be obtained which has the same data as that of the data source. As a result, an encoded stream can be generated and transmitted in which the time code attached to the original material data is described in a manner corresponding to each picture. Also, at the receiving end, a recording medium may be obtained having the original material data and the time code attached to each frame of the original material data recorded thereon.

In an editing system or method according to this invention, an editing list may be generated based on editing points set in the source video data, and an encoded stream may be generated in which the time code attached to each frame of the source video data is described or inserted in the picture layer of a plurality of layers at the transmitting end. This encoded stream may be transmitted to the receiving end at which the encoded stream is decoded, and by analyzing the syntax of the encoded stream, the time code is extracted from the picture layer of the encoded stream, and the decoded source video data is edited based on the time code and the editing list. As a result, the same editing process as at the transmitting end can be performed at the receiving end using the time code attached to each frame of the source video data.

In an editing system or method according to another aspect of this invention, an editing list may be generated based on editing points set in the source video data, and an encoded stream may be generated in which the time code attached to each frame of the source video data is described or inserted in the picture layer of a plurality of layers. This encoded stream may be edited based on the time code and the editing list obtained by analyzing the syntax of the encoded stream. As a result, the encoded stream can be edited using the time code attached to each frame of the source video data.

In an editing system or method according to still another aspect of this invention, an editing list may be generated based on editing points set by processing baseband source video data, and an encoded stream may be generated in which the time code attached to each frame of the source video data is described or inserted in the picture layer of a plurality of layers of the encoded stream having a hierarchical structure, which layers are generated by encoding the source video data. The encoded stream may be edited at a stream level based on the time code and the editing list obtained by analyzing the syntax of the encoded stream. As a result, the encoded stream can be edited at a stream level and the deterioration of the image quality can be prevented.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. An editing system for editing source video data, comprising:
 means for generating an editing list based on editing points set in the source video data;
 encoding means for generating an encoded stream having a plurality of layers generated by encoding the source video data, wherein time code information attached to each frame of the source video data is described in a picture layer among the plurality of layers;
 transmission means for transmitting the encoded stream;
 decoding means for decoding the encoded stream transmitted through the transmission means and extracting the time code information from the picture layer of the encoded stream by parsing the syntax of the encoded stream; and editing means for editing the video data decoded by the decoding means based on the time code information obtained by parsing the syntax of the encoded stream and the editing list.

2. An editing system according to claim 1, wherein the plurality of layers of the encoded stream include a sequence layer, a GOP layer, the picture layer, a slice layer, and a macroblock layer.

3. An editing system according to claim 2, wherein:
a data element defined by a sequence_header( ) function, a data element defined by a sequence_extention( ) function and a data element defined by an extention_and_user_data(0) are described in the sequence layer;
a data element defined by a group_of_picture_header( ) function and a data element defined by an extention_and_user_data(1) are described in the GOP layer;
a data element defined by a picture_header( ) function, a data element defined by a picture_coding_extention( ) function and a data element defined by an extention_and_user_data(2) are described in the picture layer; and
the time code information is defined by a time_code( ) function indicated by a user_data( ) function indicated by an extention_and_user_data(2) function.

4. An editing system according to claim 1, wherein the time code information is data described in the user data area of the picture layer and a marker bit is inserted therein at predetermined intervals so that the time code information may not be mistaken for a unique start code contained in the encoded stream when analyzing the encoded stream.

5. An editing system according to claim 1, further comprising encoded audio stream generating means for generating an encoded audio stream obtained by encoding source audio data corresponding to the source video data, wherein the time code information attached to each frame of the source audio data is described in an auxiliary data area of the encoded audio stream.

6. An editing system according to claim 5, wherein phase information indicating a phase difference between a respective frame of the source video data and the corresponding frame of the audio data, and the time code information corresponding to the source audio data are described in the auxiliary data area of the encoded audio stream.

7. An editing system according to claim 1, wherein the time code information includes a longitudinal time code/linear time code (LTC) and a vertical interval time code (VITC).

8. An editing method for editing source video data, comprising the steps of:
generating an editing list based on editing points set in the source video data;
generating an encoded stream having a plurality of layers generated by encoding the source video data, wherein time code information attached to each frame of the source video data is described in a picture layer among the plurality of layers;
transmitting the encoded stream;
decoding the transmitted encoded stream and extracting the time code information from the picture layer of the encoded stream by parsing the syntax of the encoded stream; and
editing the decoded video data based on the time code information obtained by parsing the syntax of the encoded stream and the editing list.

9. An editing method according to claim 8, wherein the plurality of layers of the encoded stream include a sequence layer, a GOP layer, the picture layer, a slice layer, and a macroblock layer.

10. An editing method according to claim 9, wherein:
a data element defined by a sequence_header( ) function, a data element defined by a sequence_extention( ) function and a data element defined by an extention_and_user_data(0) are described in the sequence layer;
a data element defined by a group_of_picture_header( ) function and a data element defined by an extention_and_user_data(1) are described in the GOP layer;
a data element defined by a picture_header( ) function, a data element defined by a picture_coding_extention( ) function and a data element defined by an extention_and_user_data(2) are described in the picture layer; and
the time code information is defined by a time_code( ) function indicated by a user_data( ) function indicated by an extention_and_user_data(2) function.

11. An editing method according to claim 8, wherein the time code information is data described in the user data area of the picture layer and a marker bit is inserted therein at predetermined intervals so that the time code information may not be mistaken for a unique start code contained in the encoded stream.

12. An editing method according to claim 8, further including the step of generating an encoded audio stream obtained by encoding source audio data corresponding to the source video data, wherein the time code information attached to each frame of the source audio data is described in the auxiliary data area of the encoded audio stream.

13. An editing method according to claim 12, wherein phase information indicating a phase difference between a respective frame of the source video data and the corresponding frame of the source audio data, and the time code information corresponding to the source audio data are described in the auxiliary data area of the encoded audio stream.

14. An editing method according to claim 8, wherein the time code information includes a longitudinal time code/linear time code (LTC) and a vertical interval time code (VITC).

15. An editing system for editing an encoded stream obtained by encoding source video data, comprising:
means for generating an editing list based on editing points set in the source video data;
encoding means for generating an encoded stream having a plurality of layers generated by encoding the source video data, wherein time code information attached to each frame of the source video data is described in a picture area among the plurality of layers; and
editing means for editing the encoded stream based on the time code information obtained by parsing the syntax of the encoded stream and the editing list.

16. An editing system according to claim 15, wherein the plurality of layers of the encoded stream include a sequence layer, a GOP layer, the picture layer, a slice layer, and a macroblock layer.

17. An editing system according to claim 16, wherein:
a data element defined by a sequence_header( ) function, a data element defined by a sequence_extention( ) function and a data element defined by an extention_and_user_data(0) are described in the sequence layer;
a data element defined by a group_of_picture_header( ) function and a data element defined by an extention_and_user_data(1) are described in the GOP layer;
a data element defined by a picture_header( ) function, a data element defined by a picture_coding_extention( )

function and a data element defined by an extention_and_user_data(2) are described in the picture layer; and the time code information is defined by a time_code( ) function indicated by a user_data( ) function indicated by an extention_and_user_data(2) function.

18. An editing system according to claim 15, wherein the time code information is data described in the user data area of the picture layer and a marker bit is inserted therein at predetermined intervals so that the time code information described in the user data area of the picture layer may not be mistaken for a start code unique to the encoded stream when analyzing the encoded stream.

19. An editing system according to claim 15, further comprising means for generating an encoded audio stream obtained by encoding source audio data corresponding to the source video data, wherein the time code information attached to each frame of the source audio data is described in an auxiliary data area of the encoded audio stream.

20. An editing system according to claim 19, wherein phase information indicating a phase difference between a respective frame of the source video data and the corresponding frame of the source audio data, and the time code corresponding to the source audio data are described in the auxiliary data area of the encoded audio stream.

21. An editing system according to claim 15, wherein the time code information includes a longitudinal time code/linear time code (LTC) and a vertical interval time code (VITC).

22. An editing method for editing an encoded stream obtained by encoding source video data, comprising the steps of:

generating an editing list based on editing points set in the source video data;

generating an encoded stream having a plurality of layers generated by encoding the source video data, wherein time code information attached to each frame of the source video data is described in a picture layer among the plurality of layers; and editing the encoded stream based on the time code information obtained by parsing the syntax of the encoded stream and the editing list.

23. An editing method according to claim 22, wherein the plurality of layers of the encoded stream include a sequence layer, a GOP layer, the picture layer, a slice layer, and a macroblock layer.

24. An editing method according to claim 23, wherein:

a data element defined by a sequence_header ( ) function, a data element defined by a sequence_extention( ) function and a data element defined by an extention_and_user_data(0) are described in the sequence layer;

a data element defined by a group_of_picture_header( ) function and a data element defined by an extention_and_user_data(1) are described in the GOP layer;

a data element defined by a picture_header( ) function, a data element defined by a picture_coding_extention( ) function and a data element defined by an extention_and_user_data(2) are described in the picture layer; and the time code information is defined by a time_code( ) function indicated by a user_data( ) function indicated by an extention_and_user_data(2) function.

25. An editing method according to claim 22, wherein the time code information is data described in the user data area of the picture layer and a marker bit is inserted therein at predetermined intervals so that the time code information described in the user data area of the picture layer may not be mistaken for a start code unique to the encoded stream when analyzing the encoded stream.

26. An editing method according to claim 22, further comprising generating an encoded audio stream obtained by encoding source audio data corresponding to the source video data, wherein the time code information attached to each frame of the source audio data is described in an auxiliary data area of the encoded audio stream.

27. An editing method according to claim 26, wherein phase information indicating a phase difference between a respective frame of the source video data and the corresponding frame of the audio data, and the time code information corresponding to the source audio data are described in the auxiliary data area of the encoded audio stream.

28. An editing method according to claim 22, wherein the time code information includes a longitudinal time code/linear time code and a vertical interval time code (VITC).

29. An editing system for editing an encoded stream, comprising:

a baseband system for generating an editing list based on editing points set by processing baseband source video data; and an encoding system for generating an encoded stream having a plurality of layers generated by encoding the source video data, wherein time code information attached to each frame of the source video data is described in a picture layer among the plurality of layers, and the encoded stream is edited at the stream level based on the time code information obtained by parsing the syntax of the encoded stream and the editing list generated in the baseband system.

30. An editing system according to claim 29, wherein the plurality of layers of the encoded stream include a sequence layer, a GOP layer, the picture layer, a slice layer, and a macroblock layer.

31. An editing system according to claim 30, wherein:

a data element defined by a sequence_header ( ) function, a data element defined by a sequence_extention( ) function and a data element defined by an extention_and_user_data(0) are described in the sequence layer;

a data element defined by a group_of_picture_header( ) function and a data element defined by an extention_and_user_data(1) are described in the GOP layer;

a data element defined by a picture_header( ) function, a data element defined by a picture_coding_extention( ) function and a data element defined by an extention_and_user_data(2) are described in the picture layer; and the time code information is defined by a time_code( ) function indicated by a user_data( ) function indicated by an extention_and_user_data(2) function.

32. An editing system according to claim 29, wherein the time code information is data described in the user data area of the picture layer and a marker bit is inserted therein at predetermined intervals so that the time code described in the user data area of the picture layer may not be mistaken for a start code unique to the encoded stream when analyzing the encoded stream.

33. An editing system according to claim 29, further comprising encoded audio stream generating means for generating an encoded audio stream obtained by encoding source audio data corresponding to the source video data, wherein the time code information attached to each frame of the source audio data is described in an auxiliary data area of the encoded audio stream.

34. An editing system according to claim 33, wherein phase information indicating a phase difference between a respective frame of the source video data and the corresponding frame of the source audio data, and the time code information corresponding to the source audio data are described in the auxiliary data area of the encoded audio stream.

35. An editing system according to claim 29, wherein the time code information includes a longitudinal time code/linear time code (LTC) and a vertical interval time code (VITC).

36. An editing method for editing an encoded stream, comprising the steps of:

generating an editing list based on editing points set by processing baseband source video data; and generating an encoded stream having a plurality of layers generated by encoding the source video data, wherein time code information attached to each frame of the source video data is described in a picture layer among the plurality of layers, and the encoded stream is edited at the stream level based on the time code information obtained by parsing the syntax of the encoded stream and the generated editing list.

37. An editing method according to claim 36, wherein the plurality of layers of the encoded stream include a sequence layer, a GOP layer, the picture layer, a slice layer, and a macroblock layer.

38. An editing method according to claim 37, wherein:

a data element defined by a sequence_header( ) function, a data element defined by a sequence_extention( ) function and a data element defined by an extention_and_user_data(0) are described in the sequence layer;

a data element defined by a group_of_picture_header( ) function and a data element defined by an extention_and_user_data(1) are described in the GOP layer;

a data element defined by a picture_header( ) function, a data element defined by a picture_coding_extention( ) function and a data element defined by an extention_and_user_data(2) are described in the picture layer; and the time code information is defined by a time_code( ) function indicated by a user_data( ) function indicated by an extention_and_user_data(2) function.

39. An editing method according to claim 36, wherein the time code information is data described in the user data area of the picture layer and a marker bit is inserted therein at predetermined intervals so that the time code information described in the user data area of the picture layer may not be mistaken for a unique start code contained in the encoded stream.

40. An editing method according to claim 36, further comprising generating an encoded audio stream obtained by encoding source audio data corresponding to the source video data, wherein the time code information attached to each frame of the source audio data is described in an auxiliary data area of the encoded audio stream.

41. An editing method according to claim 40, wherein phase information indicating a phase difference between a respective frame of the source video data and the corresponding frame of the audio data, and the time code information corresponding to the source audio data are described in the auxiliary data area of the encoded audio stream.

42. An editing method according to claim 36, wherein the time code information includes a longitudinal time code/linear time code (LTC) and a vertical interval time code (VITC).

* * * * *